US012682866B2

(12) United States Patent
Lee et al.

(10) Patent No.: US 12,682,866 B2
(45) Date of Patent: Jul. 14, 2026

(54) DISPLAY DEVICE

(71) Applicant: LG Display Co., Ltd., Seoul (KR)

(72) Inventors: JungHyun Lee, Paju-si (KR);
ChanYong Jeong, Paju-si (KR)

(73) Assignee: LG DISPLAY CO., LTD., Seoul (KR)

( * ) Notice: Subject to any disclaimer, the term of this
patent is extended or adjusted under 35
U.S.C. 154(b) by 0 days.

(21) Appl. No.: 19/228,475

(22) Filed: Jun. 4, 2025

(65) Prior Publication Data

US 2026/0120661 A1 Apr. 30, 2026

(30) Foreign Application Priority Data

Oct. 31, 2024 (KR) ........................ 10-2024-0152428

(51) Int. Cl.
*G09G 3/36* (2006.01)
*G02F 1/1362* (2006.01)
*G02F 1/1368* (2006.01)
(52) U.S. Cl.
CPC ..... *G09G 3/3677* (2013.01); *G02F 1/136209*
(2013.01); *G02F 1/136286* (2013.01); *G02F*
*1/1368* (2013.01); *G09G 2300/043* (2013.01);
*G09G 2330/021* (2013.01)
(58) Field of Classification Search
None
See application file for complete search history.

(56) References Cited

U.S. PATENT DOCUMENTS

2020/0058723 A1* 2/2020 Lee ...................... G09G 3/3233
2022/0359577 A1* 11/2022 Jeong ....................... G09G 3/32
2023/0178007 A1* 6/2023 Dai ..................... H10D 86/451
                                                          345/55
2023/0180538 A1* 6/2023 Jeong ................... H10K 59/874
                                                          257/40
2025/0275366 A1* 8/2025 Moon .................. H10K 59/124

FOREIGN PATENT DOCUMENTS

CN          115295560 A    11/2022
CN          115440786 A    12/2022
KR   10-2017-0109182 A      9/2017
KR   10-2022-0069487 A      5/2022
KR   10-2024-0033744 A      3/2024

* cited by examiner

*Primary Examiner* — Dorothy Harris
(74) *Attorney, Agent, or Firm* — Birch, Stewart, Kolasch
& Birch, LLP

(57) ABSTRACT

A display device includes a display panel including a display
area in which gate lines, data lines and thin film transistors
are arranged, and first and second bezel areas located around
the display area; a gate driving circuit arranged in at least
one of the first and second bezel areas and configured to
drive the gate lines; and dummy holes arranged in at least
one of the display area and the first and second bezel areas.
Further, each of the gate lines includes a start end connected
to the gate driving circuit located in any one of the first and
second bezel areas and an end located in the other one of the
first and second bezel areas, and a density of the dummy
holes differs according to a distance from the end of each
gate line.

29 Claims, 27 Drawing Sheets

Hydrogen diffusion path

Hydrogen degasification : Channel $\longrightarrow$ Conductorized area
$\longrightarrow$ S/D metal $\longrightarrow$ PXL $\longrightarrow$ Air : Vth (+) shift

AA1

DH

GL

GIP

AA2

GL

DH

DISPLAY DEVICE

CROSS-REFERENCE TO RELATED APPLICATION

This application claims the priority to Korean Patent Application No. 10-2024-0152428, filed in the Republic of Korea on Oct. 31, 2024, the entire contents of which is hereby expressly incorporated by reference into the present application.

BACKGROUND

Field of the Invention

The present disclosure relates to a display device having a hydrogen degasification path.

Discussion of the Related Art

A display device includes a thin film transistor as a switching element or a driving element. For example, an oxide semiconductor thin film transistor using an oxide semiconductor material as an active layer in a display device is widely used. In particular, oxide semiconductor thin film transistors have advantages of higher mobility than amorphous silicon thin film transistors, and lower manufacturing cost and lower off-current than polycrystalline silicon thin film transistors. However, the oxide semiconductor thin film transistor is heavily influenced by hydrogen flowing into the active layer, and electrical characteristics such as a threshold voltage can be changed.

In the display device, the amount of hydrogen inflow can be increased toward an end of the gate line due to a structural difference between the start end of the gate line, which contacts a gate driving circuit in a bezel area on one side, and the end of the gate line, which does not contact the gate driving circuit in a bezel area on the other side. Accordingly, as the display device is closer to the end of the gate line (compared to the start end of the gate line), the amount of hydrogen inflow is increased, so that the threshold voltage of the thin film transistor can be shifted in a negative direction. That is, a threshold voltage deviation of the thin film transistor can occur due to a difference in the amount of hydrogen inflow depending on a distance from the end of the gate line.

SUMMARY

Accordingly, the present disclosure is directed to providing a display device that substantially obviate one or more problems due to limitations and disadvantages of the related art.

In one aspect, the present disclosure provides a display device that can minimize a threshold voltage deviation of a thin film transistor according to a position in a display area by using a hydrogen degasification path.

In another aspect, the present disclosure provides a display device that can prevent a threshold voltage of a thin film transistor from being shifted in a negative direction in a display area by using a hydrogen degasification path.

Additional advantages and features of the disclosure will be set forth in part in the description which follows and in part will become apparent to those having ordinary skill in the art upon examination of the following or can be learned from practice of the disclosure. The technical benefits and other advantages of the disclosure can be realized and attained by the structure particularly pointed out in the written description and claims hereof as well as the appended drawings.

To achieve these and other benefits and in accordance with the purpose of the disclosure, as embodied and broadly described herein, the present disclosure provides a display device including a display panel including a display area in which gate lines, data lines and thin film transistors are arranged, and first and second bezel areas located around the display area, a gate driving circuit arranged in at least one of the first and second bezel areas and configured to drive the gate lines, dummy holes arranged in at least one of the display area and the first and second bezel areas. In addition, each of the gate lines can include a start end connected to the gate driving circuit located in any one of the first and second bezel areas and an end located in the other one of the first and second bezel areas, and a density of the dummy holes can differ according to a distance from the end of each gate line.

It is to be understood that both the foregoing general description and the following detailed description of the present disclosure are exemplary and explanatory and are intended to provide further explanation of the disclosure.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

Figure 1:
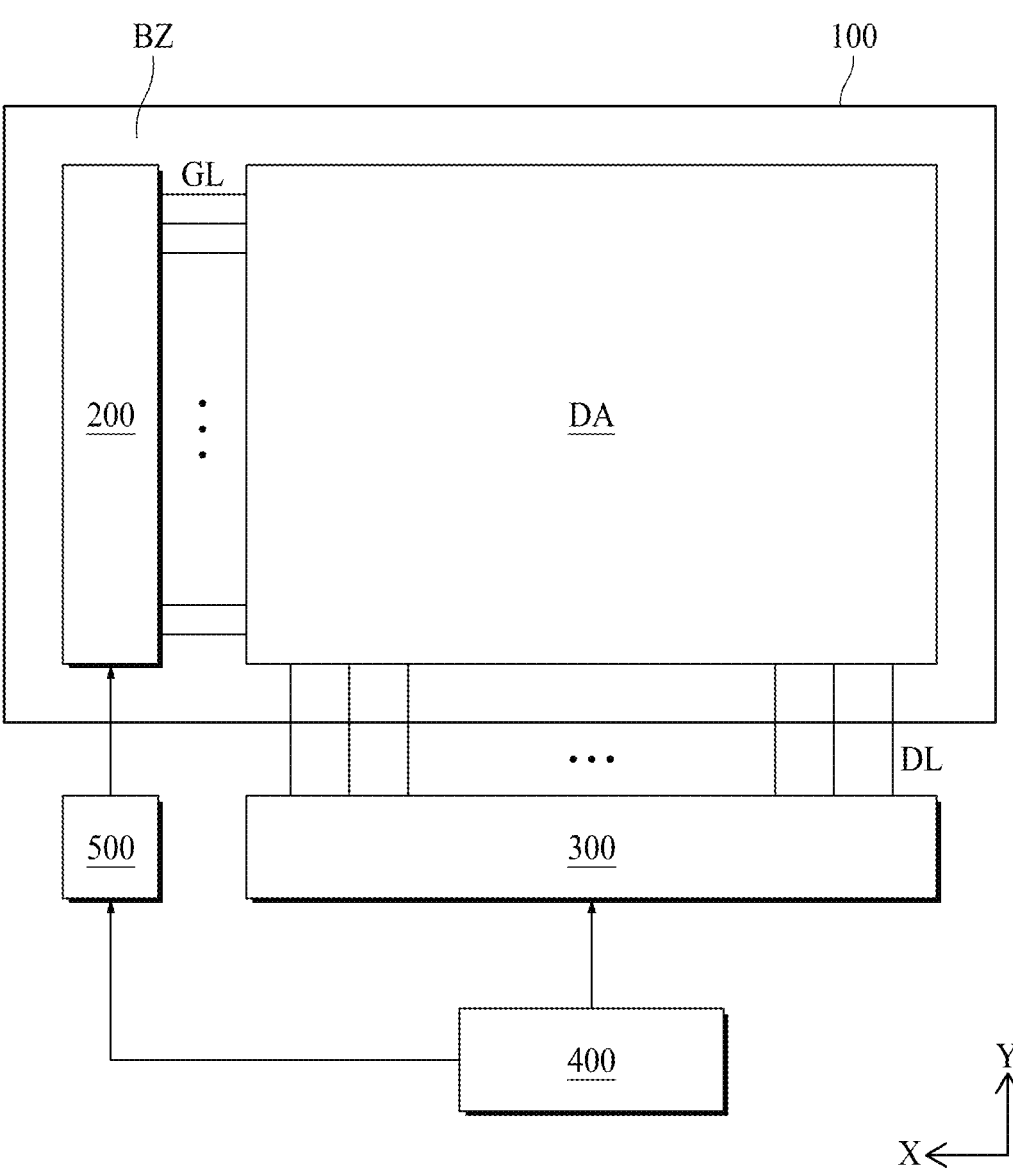
FIG. 1 is a schematic block diagram illustrating a display device according to an embodiment of the present disclosure.

DETAILED DESCRIPTION OF THE
DISCLOSURE

Advantages and features of the present disclosure, and implementation methods thereof will be clarified through the following embodiments, described with reference to the accompanying drawings. The present disclosure can, however, be embodied in different forms and should not be construed as being limited to the embodiments set forth herein. Rather, these embodiments are provided so that this disclosure will be thorough and complete, and will fully convey the scope of the present disclosure to those skilled in the art.

The shapes, sizes, ratios, angles, and numbers disclosed in the drawings for describing embodiments of the present disclosure are merely examples, and thus the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In the case in which "comprise," "have," and "include" described in the present disclosure are used, another part can also be present unless "only" is used. The terms in a singular form can include plural forms unless noted to the contrary. In construing an element, the element is construed as including an error region although there is no explicit description thereof. In describing a positional relationship, for example, when the positional order is described as "on," "above,"

"below," "beneath," and "next," the case of no contact therebetween can be included, unless "just" or "direct" is used.

If it is mentioned that a first element is positioned "on" a second element, it does not mean that the first element is essentially positioned above the second element in the figure. The upper part and the lower part of an object concerned can be changed depending on the orientation of the object. Consequently, the case in which a first element is positioned "on" a second element includes the case in which the first element is positioned "below" the second element as well as the case in which the first element is positioned "above" the second element in the figure or in an actual configuration. In describing a temporal relationship, for example, when the temporal order is described as "after," "subsequent," "next," and "before," a case which is not continuous can be included, unless "just" or "direct" is used.

It will be understood that, although the terms "first," "second," etc., can be used herein to describe various elements, these elements should not be limited by these terms. These terms are only used to distinguish one element from another. For example, a first element could be termed a second element, and, similarly, a second element could be termed a first element.

It should be understood that the term "at least one" includes all combinations related with any one item. For example, "at least one among a first element, a second element and a third element" can include all combinations of two or more elements selected from the first, second and third elements as well as each element of the first, second and third elements. Features of various embodiments of the present disclosure can be partially or overall coupled to or combined with each other, and can be variously inter-operated with each other and driven technically The embodiments of the present disclosure can be carried out independently from each other, or can be carried out together in a co-dependent relationship.

Hereinafter, the aspect of the present disclosure will be described with reference to the accompanying drawings. Since a scale of each of elements shown in the accompanying drawings is different from an actual scale for convenience of description, the present disclosure is not limited to the shown scale. Further, all the components of each display apparatus, display device, and display panel according to all aspects of the present disclosure are operatively coupled and configured.

Figure 2:
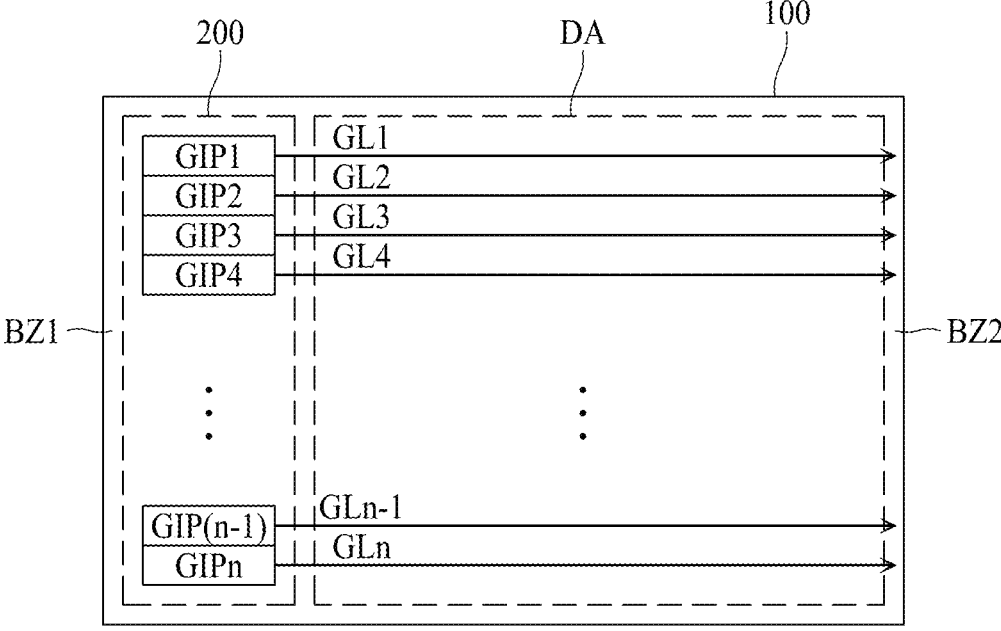
FIG. 2 is a view illustrating a single feeding driving method of a display device according to an embodiment of the present disclosure.
Figure 3:
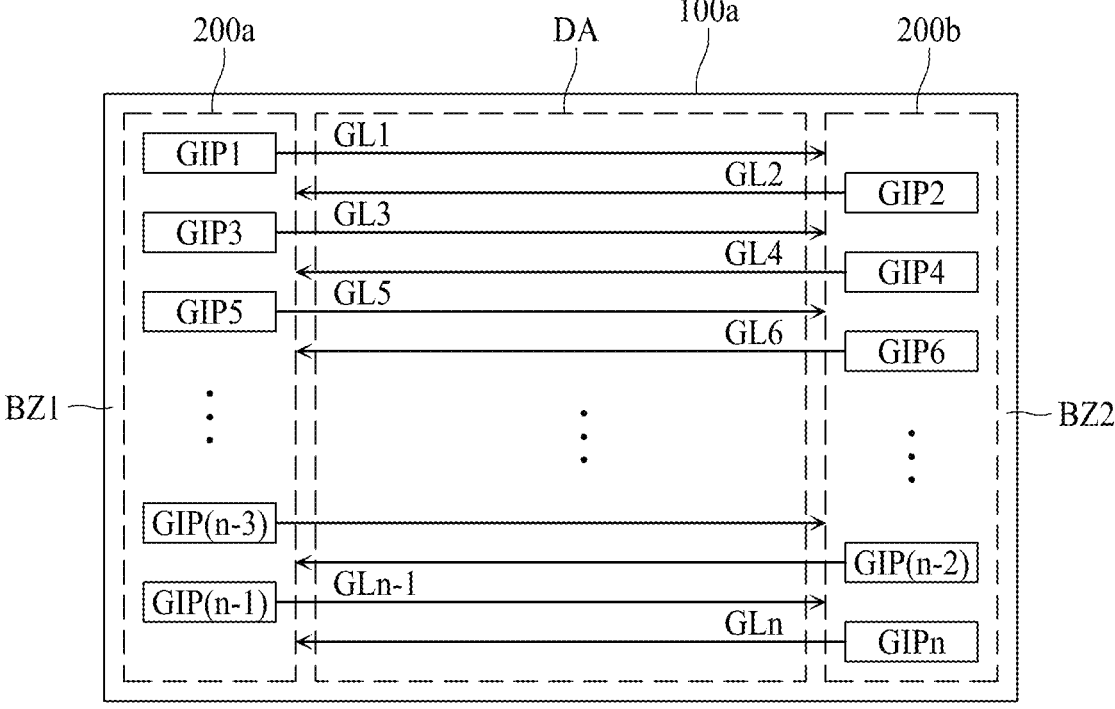
FIG. 3 is a view illustrating an interlacing driving method of a display device according to an embodiment of the present disclosure.

FIG. 1 is a schematic block diagram illustrating a configuration of a display device 1000, FIG. 2 is a view illustrating a single feeding driving method of a display device, and FIG. 3 is a view illustrating an interlacing driving method of a display device according to an embodiment of the present disclosure.

Referring to FIG. 1, the display device 1000 can include a display panel 100, a gate driving circuit 200, a data driving circuit 300, a timing controller 400, a level shifter 500, and the like. Also, the gate driving circuit 200 can be embedded in the display panel 100. Further, the display device 1000 can be a liquid crystal display device, but is not limited thereto. That is, the display device 200 can be any one of various display devices including an electroluminescent display device, a micro light emitting diode (LED) display device, and the like. In addition, the electroluminescent display device can be an organic light emitting diode (OLED) display device, a quantum-dot light emitting diode display device, or an inorganic light emitting diode display device.

As shown in FIG. 1, the display panel 100 can include a display area DA in which a plurality of subpixels SP are arranged in a matrix form, and a bezel area BZ located around the display area DA. The display panel 100 can further include a touch sensor that overlaps the display area DA to sense a user's touch. Also, the display area DA of the display panel 100 can include a plurality of pixels composed of three or four color subpixels that emit light of different colors, thereby displaying an image. For example, the subpixels can include a red subpixel that emits red light, a green subpixel that emits green light, and a blue subpixel that emits blue light, and can further include a white subpixel that emits white light.

In addition, the display panel 100 can be a liquid crystal panel and include first and second substrates bonded to each other with a liquid crystal layer interposed therebetween, and a polarizing plate attached to each of outer sides of the first and second substrates. On the first substrate of the display panel 100, a thin film transistor of the subpixels and various signal lines and electrodes including gate and data lines GL and DL connected to the thin film transistor and a pixel electrode can be arranged, and driving circuits including the gate driving circuit 200 can be arranged. A common electrode can also be arranged on any one of the first and second substrates of the display panel 100. Further, a black matrix and a color filter of the subpixels can be arranged on any one of the first and second substrates of the display panel 100.

In the display panel 100, the subpixels can be independently driven by the thin film transistor connected to the gate line GL and the data line DL. Each subpixel can charge a differential voltage between a data signal supplied to the pixel electrode through the thin film transistor and a common voltage supplied to a common electrode and drive a liquid crystal in accordance with the charged voltage, thereby adjusting transmittance of light transmitted from a backlight unit through the display panel 100 and the polarizing plate. Each subpixel can also express a gray scale of an image by multiplying brightness of the backlight unit by light transmittance controlled in accordance with the data signal in each subpixel.

In addition, the display panel 100 can be driven in a twisted nominal (TN) mode or a vertical alignment (VA) mode by a vertical electric field applied to the liquid crystal layer through the pixel electrode and the common electrode, can be driven in an in-plane switching (IPS) mode by a horizontal electric field applied to the liquid crystal layer through the pixel electrode and the common electrode, or can be driven in a fringe field switching (FFS) mode by a fringe electric field applied to the liquid crystal layer through the pixel electrode and the common electrode.

Also, a plurality of thin film transistors arranged in the display area DA of the display panel 100 and the bezel area BZ including the gate driving circuit 200 can include at least one of an amorphous silicon thin film transistor, a polycrystalline silicon thin film transistor, or an oxide semiconductor thin film transistor. The display panel 100 can also include a coplanar type oxide semiconductor thin film transistor.

Further, the display panel 100 can include a signal line including a gate line GL and a data line DL, and/or a hydrogen degasification path (dummy hole, passivation hole) arranged on at least one insulating layer that overlaps or is adjacent to the thin film transistor. The display panel 100 can also differentially apply the density of the hydrogen degasification path arranged in a direction of the gate line GL depending on a distance from the end of the gate line GL. Accordingly, the display panel 100 can minimize a difference in the amount of hydrogen inflow due to a structural difference between a start end and an end of the gate line GL, thereby minimizing a threshold voltage deviation of the thin film transistor and preventing a threshold voltage of the thin film transistor from being shifted to a negative voltage. This will be described in more detail later.

In addition, the gate driving circuit 200 can be arranged in any one of both bezel areas BZ facing each other with the display area DA interposed therebetween in the display panel 100, or can be arranged in both bezel areas BZ. The gate driving circuit 200 can also be embedded in the bezel area BZ in a gate in panel (GIP) type including thin film transistors formed in the same process as that of the thin film transistor in the display area DA.

Further, the gate driving circuit 200 can operate by receiving a plurality of gate control signals supplied from the timing controller 400 through the level shifter 500. That is, the gate driving circuit 200 can receive the plurality of gate control signals from the timing controller 400, and can individually drive the gate lines GLs of the display panel 100. The gate driving circuit 200 can also output a scan signal of a gate-on voltage to the corresponding gate line GL during a driving period of each gate line GL, and can output a gate-off voltage to the corresponding gate line GL during a non-driving period of each gate line GL.

Further, the level shifter 500 can generate a plurality of gate control signals by receiving control signals from the timing controller 400 and level-shifting or logic-processing the control signals and output the gate control signals to the gate driving circuit 200. In addition, the data driving circuit 300 can convert digital data supplied together with the data control signals from the timing controller 400 into an analog data signal to supply the data signal to the data line DL of the display panel 100. The data driving circuit 300 can also subdivide a plurality of reference gamma voltages supplied from a gamma voltage generator, and can convert the digital data into an analog data voltage by using the subdivided gamma voltages.

In addition, the data driving circuit 300 can include at least one data driving integrated circuit (IC packaged on the bezel area BZ of the display panel 100 or packaged on a circuit film and thus electrically connected to the display panel 100. Also, the timing controller 400 can receive source image data and timing control signals from an external host system. In more detail, the host system can be any one of a system of a portable terminal such as a computer, a TV system, a set-top box, a tablet or a mobile phone. The timing control signals can also include a dot clock, a data enable signal, a vertical synchronization signal, a horizontal synchronization signal, and the like.

Further, the timing controller 400 can control the gate driving circuit 200 and the data driving circuit 300 by using the timing control signals supplied from the host system and timing setting information stored therein. In addition, the timing controller 400 can generate a plurality of gate control signals for controlling a driving timing of the gate driving circuit 200 and output the generated gate control signals to the gate driving circuit 200. The timing controller 400 can also generate control signals for timing control so that the level shifter 500 can generate a plurality of gate control signals to supply the gate control signals to the gate driving circuit 200, and can output the control signals to the level shifter 500. Also, the timing controller 400 can generate a plurality of data control signals for controlling the driving timing of the data driving circuit 300 and output the generated data control signals to the data driving circuit 300.

In addition, the timing controller 400 can perform various image processing including luminance correction for reducing power consumption by using input image data, and can output the image-processed data to the data driving circuit 300. The timing controller 400 can also align the image-processed data to be suitable for the sub-pixel arrangement of the display panel 100 and output the aligned data to the data driving circuit 300.

Further, the gate driving circuit 200 can supply a scan signal to both ends of each gate line GL in a double feeding manner, or can supply a scan signal to one start end of each gate line GL in a single feeding manner. The gate driving circuit 200 can also supply the scan signal to the start end of the gate line GL, which is divisionally driven by an interlacing scanning manner, in a single feeding manner.

Referring to FIG. 2, the gate driving circuit 200 can include a plurality of stage circuits GIP1 to GIPn arranged in one bezel area BZ1 (a first bezel area) of the display panel 100 and individually connected to the plurality of gate lines GL1 to GLn of the display area DA. The stage circuits GIP1 to GIPn can sequentially supply scan signals to the start end of each of the gate lines GL1 to GLn in a single feeding manner. As shown, the end of each of the gate lines GL1 to GLn can be located in the other bezel area BZ2 (a second bezel area).

Referring to FIG. 3, the gate driving circuit can include first and second gate driving circuits 200a and 200b divisionally arranged in both bezel areas BZ1 and BZ2 with the display area DA interposed therebetween in the display panel 100a. As shown, the first gate driving circuit 200a arranged in the left bezel area BZ1 (the first bezel area) can include a plurality of odd-numbered stage circuits GIP1, GIP3, . . . GIPn−1 individually connected to start ends of the odd-numbered gate lines GL1, GL3, . . . GLn−1. Also, the second gate driving circuit 200b arranged in the right bezel area BZ2 (the second bezel area) can include a plurality of even-numbered stage circuits GIP2, GIP4, . . . GIPn individually connected to start ends of the even-numbered gate lines GL2, GL4, . . . GLn. As shown, the end of each of the even-numbered gate lines GL2, GL4, . . . GLn can be located in the left bezel area BZ1 (the first bezel area).

In addition, the stage circuits GIP1, GIP3, . . . GIPn−1 of the first gate driving circuit 200a can sequentially supply the scan signals to the left start end of each of the odd-numbered gate lines GL1, GL3, . . . GLn−1 in a single feeding manner. Further, the stage circuits GIP2, GIP4, . . . . GIPn of the second gate driving circuit 200b can sequentially supply the scan signals to the right start end of each of the even-numbered gate lines GL2, GL4, . . . GLn in a single feeding manner. Each of the gate lines GL1 to GLn in the display panels 100 and 100a can have a structural difference in that a start end located in any one of the first and second bezel areas BZ1 and BZ2 is connected to any one of the gate driving circuits 200, 200a and 200b and in contact with any one of them, whereas an end of the other one located in the first and second bezel areas BZ1 and BZ2 is not in contact with the gate driving circuits 200, 200a and 200b. The display panels 100 and 100a can also include a dummy hole that overlaps or is adjacent to the thin film transistor and/or the signal line in the display area DA and the bezel areas BZ1 and BZ2 to serve as a hydrogen degasification path, thereby increasing a hydrogen degasification effect. Further, the display panels 100 and 100a can differentially apply the density of the dummy hole depending on the distance from the end of each gate line GL.

Accordingly, the display panel 100 can prevent the threshold voltage of the thin film transistor from being shifted to the negative voltage and minimize the threshold voltage deviation of the thin film transistor by minimizing the difference in hydrogen inflow due to the structural difference between the start end and the end of each gate line GL.

Figure 4:
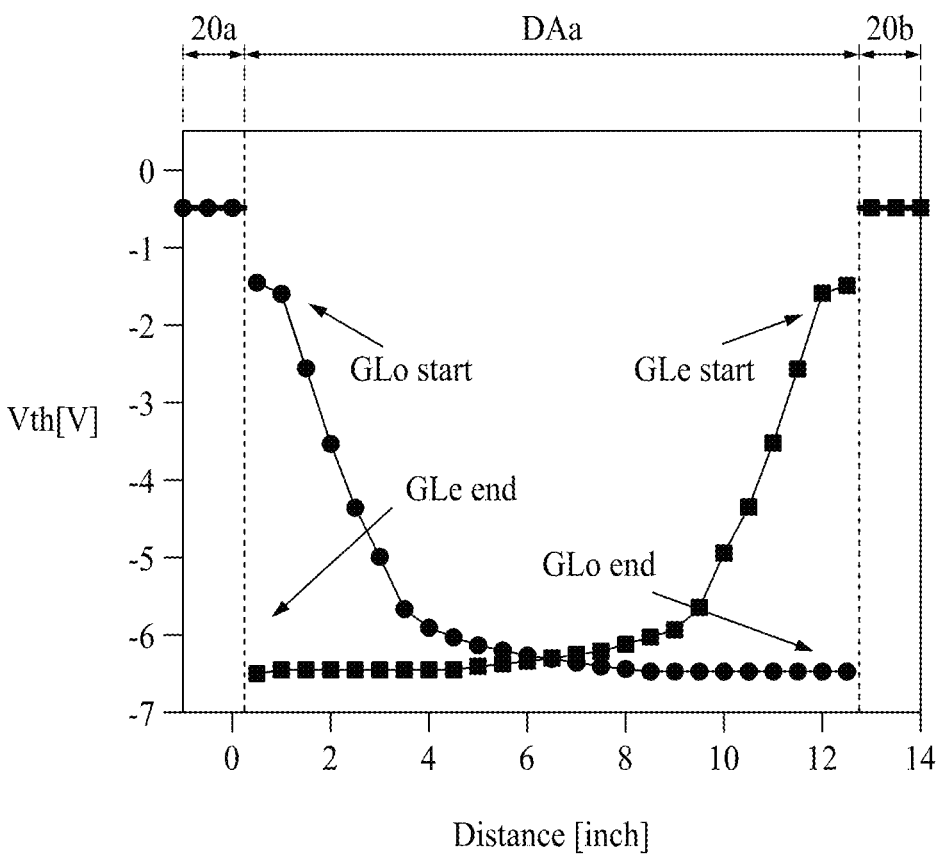
FIG. 4 is a graph illustrating a threshold voltage deviation of a thin film transistor according to a distance between a start end and an end of a gate line in a display device according to a comparative example.
Figure 5A:
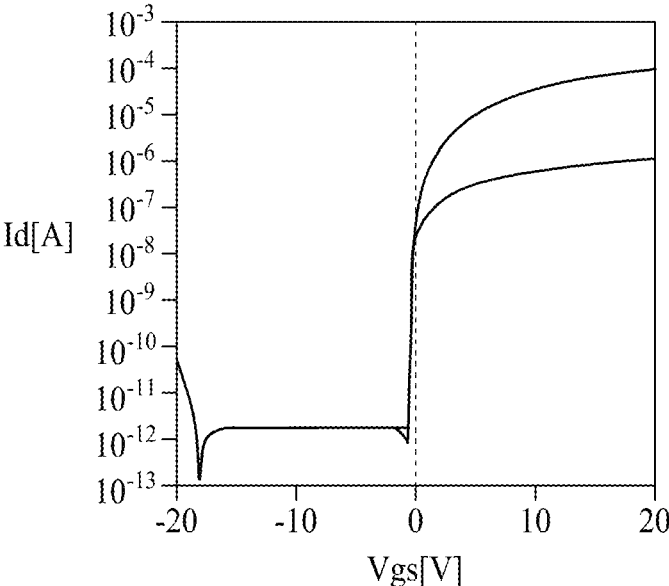
FIGS. 5A and 5B are graphs illustrating voltage-current characteristic deviation of a thin film transistor adjacent to a start end and an end of a gate line in a display device according to a comparative example of the related art.
Figure 5B:
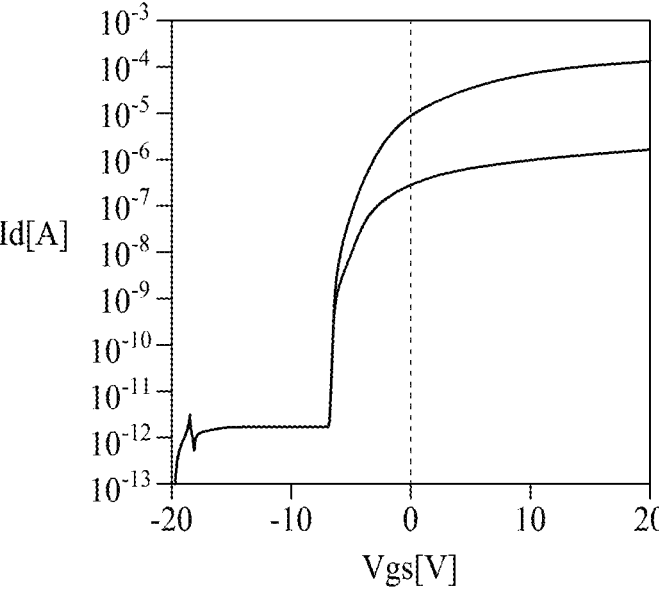

Next, FIG. 4 is a graph illustrating a threshold voltage deviation of a thin film transistor according to a distance between a start end and an end of a gate line in a display device according to a comparative example of the related art, and FIGS. 5A and 5B are graphs illustrating voltage-current characteristic deviation of a thin film transistor adjacent to a start end and an end of a gate line in a display device according to a comparative example of the related art.

Referring to FIG. 4, a display area DAa of the display device according to the comparative example can be driven by an interlacing manner so that an odd-numbered gate line GLo can be driven by a left gate driving circuit 20a, and an even-numbered gate line GLe can be driven by a right gate driving circuit 20b. As shown in FIG. 4, a threshold voltage Vth of a thin film transistor is shifted in a negative direction from a start position GLo start to an end position GLo end of the odd-numbered gate line connected to the left gate driving circuit 20a. Also, the threshold voltage Vth of the thin film transistor is shifted in a negative direction from a start position GLe start to an end position GLe end of the even-numbered gate line connected to the right gate driving circuit 20b.

Referring to FIGS. 4 and 5A, in the display area DAa of the display device according to the comparative example of the related art, the threshold voltage Vth of the thin film transistor adjacent to the start ends GLo start and GLe start of each gate line, which are in contact with the gate driving circuits 20a and 20b, is a voltage close to 0V.

Referring to FIGS. 4 and 5B, in the display area DAa of the display device according to the comparative example of the related art, the thin film transistor adjacent to the ends GLo end and GLe end of each gate line, which are not in contact with the gate driving circuits 20a and 20b, increases the amount of hydrogen inflow, so that the threshold voltage Vth is excessively shifted in the negative direction, resulting in a difference from the threshold voltage Vth of the thin film transistor at the start ends GLo start and GLe start.

That is, as shown in FIG. 4, the voltage threshold starts at zero in the bezel area and then becomes negative as the gate line crosses the display area DAa, eventually becoming a negative −6 or greater Vth. Thus, as shown, the voltage threshold significantly changes or varies as the gate line crosses the display area. As shown in FIG. 4, the voltage threshold of the transistor remains a negative value of about 6.5 from the middle of the display area to the bezel area 20a and 20b. This varying negative voltage threshold affects the characteristics of the transistors (e.g., the voltage threshold). As shown in FIG. 4, the effect is greatest as the gate line stretches across the display area to the bezel area (e.g., between inches and 13 inches in FIG. 4). Also, as shown in FIG. 4, the voltage threshold varies significantly from 1 inch to 6 inches and then levels out at a minus 6.5 voltage threshold. This varying and different voltage gate threshold negatively affects the operation of the transistors.

To solve this problem, the display panels 100 and 100a according to an embodiment of the present disclosure include dummy holes serving as a hydrogen degasification path to increase the hydrogen degasification effect. In addition, the display panels 100 and 100a can minimize the difference in hydrogen inflow by differentially applying the density of the dummy holes in accordance with the distance from the end of the gate line GL, thereby minimizing the threshold voltage deviation of the thin film transistor.

Hereinafter, the display device having a hydrogen degasification path according to an embodiment of the present disclosure will be described in detail.

Figure 6:
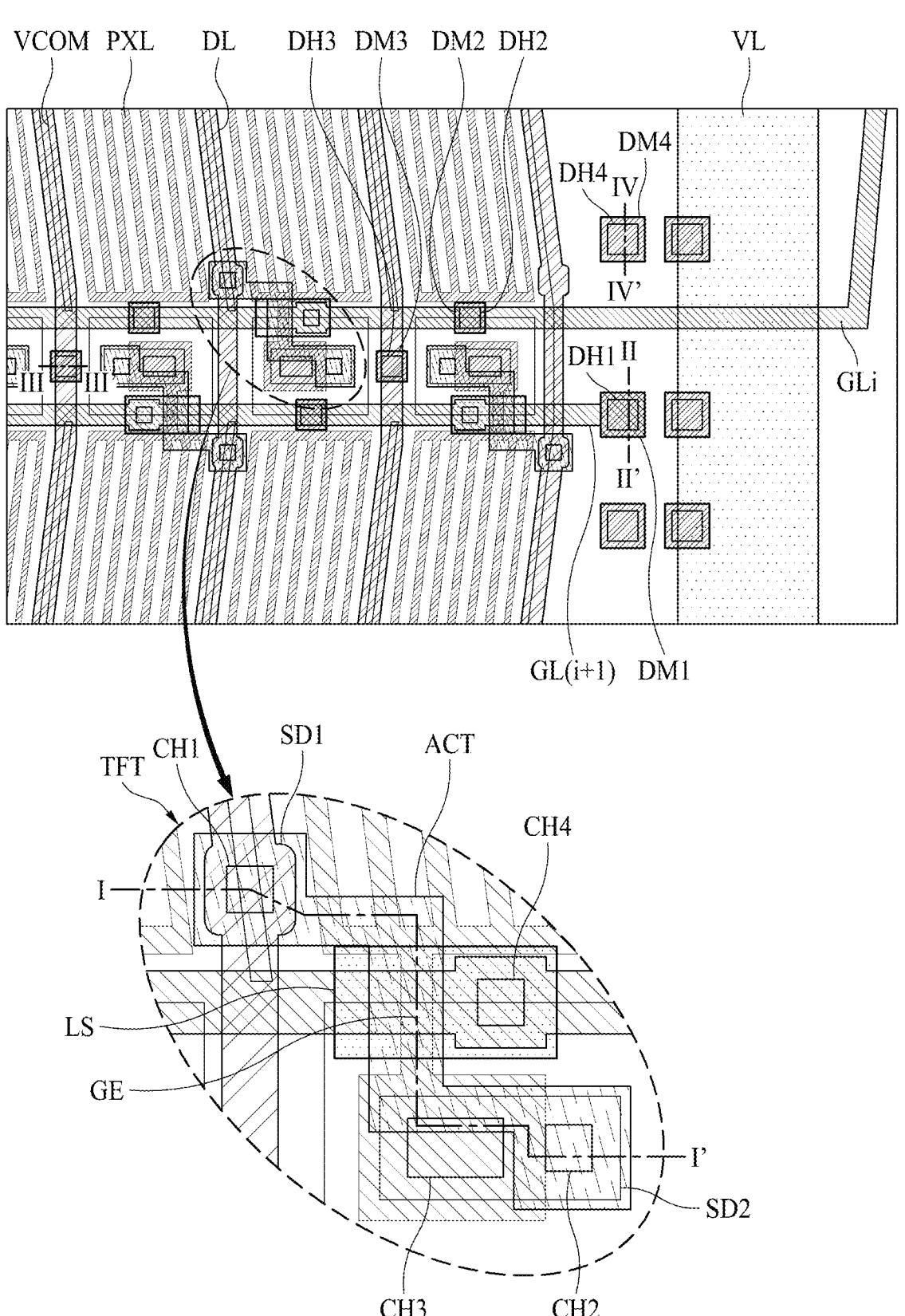
FIG. 6 is a plan view illustrating a partial area adjacent to an end of a gate line in a display area of a display device according to an embodiment of the present disclosure.
Figure 7:
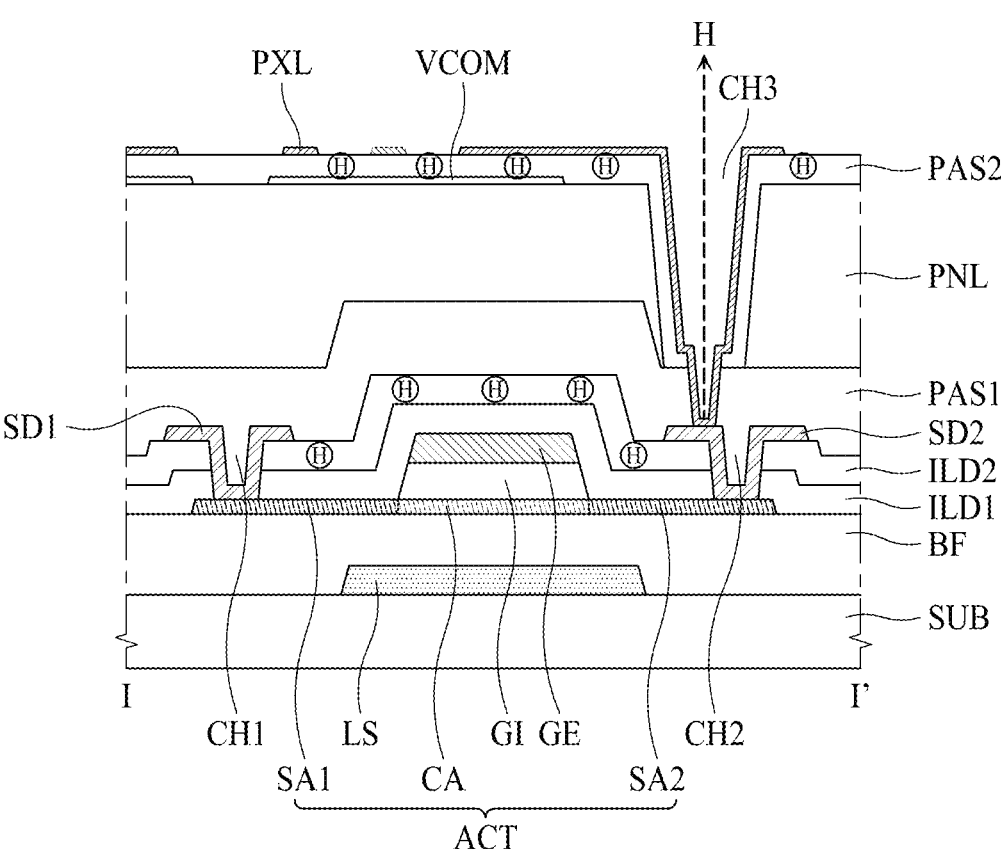
FIG. 7 is a cross-sectional view illustrating a thin film transistor taken along the line I-I' shown in FIG. 6.
Figure 8A:
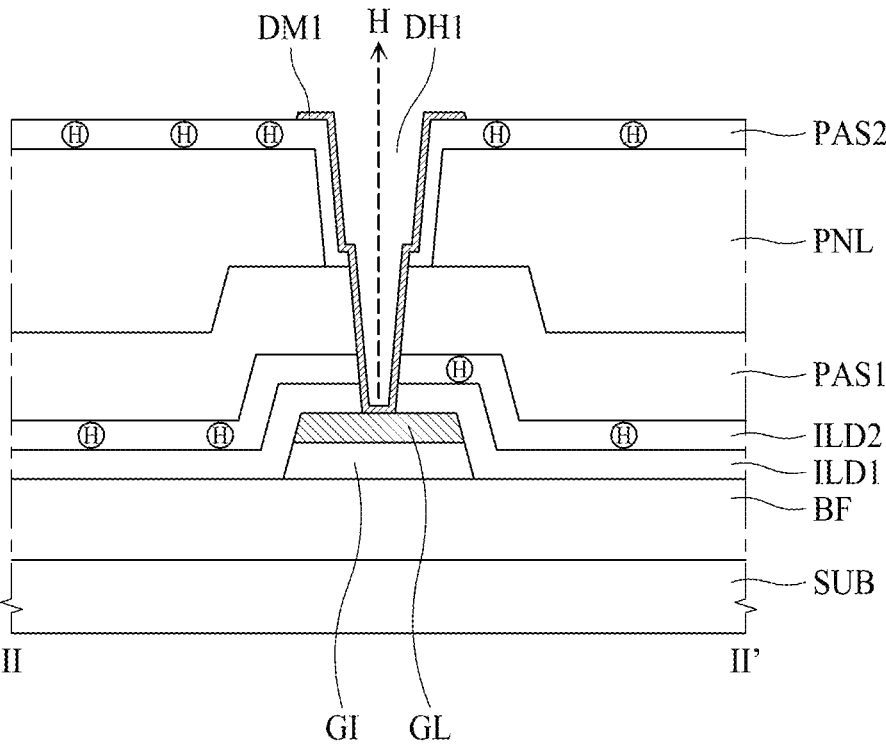
FIGS. 8A and 8B are cross-sectional views illustrating a dummy hole structure taken along lines II-II' and III-III' shown in FIG. 6.
Figure 8B:
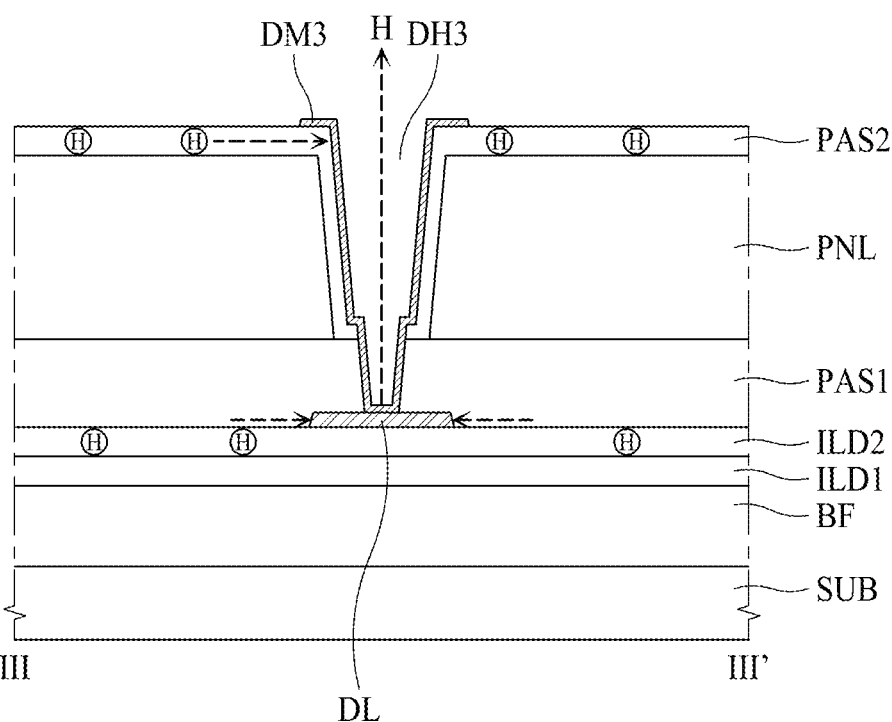

FIG. 6 is a plan view illustrating a partial area adjacent to an end of a gate line in a display area of a display device according to an embodiment of the present disclosure, FIG. 7 is a cross-sectional view illustrating a structure of a thin film transistor taken along the line I-I' shown in FIG. 6, FIGS. 8A and 8B are cross-sectional views illustrating a dummy hole structure taken along lines II-II' and III-III' shown in FIG. 6, and FIGS. 9A to 9F are cross-sectional views illustrating a dummy hole structure taken along a line IV-IV' shown in FIG. 6.

Referring to FIGS. 6 and 7, the display device can include a gate line GL: GLi and GL(i+1), a data line DL, a thin film transistor TFT, a common electrode VCOM, a pixel electrode PXL, a common voltage supply line VL, and a thin film transistor substrate on which a plurality of insulating layers are arranged. In particular, the plurality of insulating layers can include a buffer layer BF, a gate insulating layer GI, interlayer insulating layers ILD1 and ILD2, passivation layers PAS1 and PAS2, and a planarization layer PNL.

In addition, the gate line GL can be arranged in a first direction (a horizontal direction or a row direction), and the data line DL can be arranged in a second direction (a vertical direction or a column direction) and can cross the gate line GL with the interlayer insulating layers ILD1 and ILD2 interposed therebetween. Also, the thin film transistor TFT can be arranged adjacent to the intersection of the gate line GL and the data line DL and thus connected to the gate line GL and the data line DL, and can be connected to the pixel electrode PXL arranged in the pixel area.

In addition, the thin film transistor TFT can include a light shield electrode LS on the substrate SUB, a buffer layer BF covering the light shield electrode LS, an active layer ACT on the buffer layer BF, a gate insulating layer GI and a gate electrode GE, which are stacked on the active layer ACT, interlayer insulating layers ILD1 and ILD2 covering the gate electrode GE, and first and second source-drain electrodes SD1 and SD2 arranged on the interlayer insulating layer ILD2 and connected to the active layer ACT through contact holes CH1 and CH2. The thin film transistor TFT can also have a coplanar structure.

Further, the light shield electrode LS can be arranged on the substrate SUB, and the buffer layer BF covering the light shield electrode LS can be arranged. The substrate SUB can be a glass substrate or a plastic substrate.

In addition, the light shield electrode LS can protect a channel area of the active layer ACT by shielding light incident through the substrate SUB. In particular, the light shield electrode LS can be formed of a light shield metal layer having light shield characteristics. For example, the light shield metal layer can have a single layered structure that includes at least one of aluminum (Al), molybdenum (Mo), chromium (Cr), tantalum (Ta), neodymium (Nd), titanium (Ti), copper (Cu), gold (Au), silver (Ag) and their alloy, or can have a multi-layered structure in which at least two metal layers are stacked. As shown, the light shield electrode LS can also be connected to the gate electrode GE through a contact hole CH4 to serve as a double gate. Further, a common electrode supply line VL can be formed as a light shield metal layer by the same process as that of the light shield electrode LS.

In addition, the buffer layer BF can prevent an impurity such as hydrogen from flowing into the active layer ACT through the substrate SUB. In particular, the buffer layer BF can include an inorganic insulating material having a low hydrogen concentration. For example, the buffer layer BF can include an oxide-based insulating material such as silicon oxide (SiOx) or aluminum oxide (Al$_2$O$_3$), which has a low hydrogen content. Also, the active layer ACT can be arranged on the buffer layer BF, the gate insulating layer GI and the gate electrode GE can be arranged on the channel area CA of the active layer ACT to overlap each other, and the gate electrode GE can be formed integrally with the gate line GL.

Further, the active layer ACT can include an oxide semiconductor material. For example, the active layer ACT can include at least one of an IGZO(InGaZnO)-based, an IGO (InGaO)-based, an IGZTO(InGaZnSnO)-based, a GZTO (GaZnSnO)-based, a GZO(GaZnO)-based, a Go(GaO)-based, a TO(SnO)-based, an ITO(InSnO)-based, an ITZO (InSnZnO)-based, an IZO(InZnO)-based, a ZO(ZnO)-based, an IO(InO)-based, an InO(InO)-based, a ZnO-based, and a FIZO-based oxide semiconductor material. The active layer ACT can also have a single layered structure, or can have a multi-layered structure in which at least two oxide semiconductor layers are stacked.

In addition, the active layer ACT can include a channel area CA having semiconductor characteristics, and a first connection area SA1 and a second connection area SA2, which are connected to both sides of the channel area CA and conductorized. In more detail, the first connection area SA1 and the second connection area SA2 of the active layer ACT can be conductorized areas doped with a dopant by ion implantation. For example, the dopant can include at least one of boron (B), phosphorus (P), fluorine (F) and hydrogen (H). Also, the first connection area SA1 and the second connection area SA2 of the active layer ACT can be areas conductorized by dry etching or plasma treatment when the gate insulating layer GI and the gate electrode GE are patterned.

In addition, the gate insulating layer GI can be patterned in the same shape as the gate electrode GE and the gate line GL on the gate insulating layer GI. The gate insulating layer GI can include an inorganic insulating material having a low hydrogen concentration. For example, the gate insulating layer GI can include at least one of silicon oxide (SiOx), aluminum oxide (Al$_2$O$_3$), hafnium oxide (HfOx) and zirconium oxide (ZrOx).

Further, the gate electrode GE can overlap the channel area CA of the active layer ACT, and can overlap the light shield electrode LS. Also, the gate electrode GE can be formed of a gate metal layer together with the gate line GL and can be formed integrally with the gate line GL. In addition, the gate electrode GE can be included as a portion of the gate line GL, or can have a shape protruded from the gate line GL in the second direction. The gate electrode GE can be connected to the light shield electrode LS through a contact hole CH4 passing through the gate insulating layer GI and the buffer layer BF. The gate metal layer can also have a single layered structure that includes at least one of aluminum (Al), molybdenum (Mo), chromium (Cr), tantalum (Ta), neodymium (Nd), titanium (Ti), copper (Cu), gold (Au), silver (Ag) and their alloy, or can have a multi-layered structure in which at least two metal layers are stacked.

Further, the interlayer insulating layers ILD: ILD1 and ILD2 covering the active layer ACT, the gate insulating layer GI, the gate electrode GE and the gate line GL can be arranged on the buffer layer BF. In particular, the interlayer insulating layer ILD can include an inorganic insulating material and can have a single layered structure or a multi-layered structure, which includes at least one of silicon oxide (SiOx) and silicon nitride (SiNx). For example, the interlayer insulating layer ILD can have a multi-layered structure in which a first interlayer insulating layer ILD1 including silicon oxide (SiOx) having a low hydrogen concentration and a second interlayer insulating layer ILD2 including silicon nitride (SiNx) having a higher hydrogen concentration than that of the first interlayer insulating layer ILD1 are stacked.

Also, a first source-drain electrode SD1 and a second source-drain electrode SD2 can be arranged on the interlayer insulating layer ILD2 together with the data line DL. In particular, the first source-drain electrode SD1 can be connected to the first connection area SA1 of the active layer ACT through the contact hole CH1 passing through the interlayer insulating layers ILD2 and ILD1, and can be connected to or formed integrally with the data line DL. Further, the second source-drain electrode SD2 can be connected to the second connection area SA2 of the active layer ACT through the contact hole CH2 passing through the interlayer insulating layers ILD2 and ILD1. The second source-drain electrode SD2 can also be connected to the pixel electrode PXL through a contact hole CH3. In addition, the first and second source-drain electrodes SD1 and SD2 and the data line DL can be formed as a source-drain metal layer. For example, the source-drain metal layer can have a single layered structure that includes at least one of aluminum (Al), molybdenum (Mo), chromium (Cr), tantalum (Ta), neodymium (Nd), titanium (Ti), copper (Cu), gold (Au), silver (Ag) and their alloy, or can have a multi-layered structure in which at least two metal layers are stacked.

Further, the first passivation layer PAS1 covering the source-drain electrodes SD1 and SD2 and the data line DL can be arranged on the interlayer insulating layer ILD2, and the planarization layer PNL can be arranged on the first passivation layer PAS1. The common electrode VCOM can be arranged on the planarization layer PNL, and the second passivation layer PAS2 covering the common electrode VCOM can be arranged. The pixel electrode PXL can also be arranged on the second passivation layer PAS2.

In addition, the first passivation layer PAS1 and the second passivation layer PAS2 can include an inorganic insulating material, and the planarization layer PNL can include an organic insulating material. For example, the first passivation layer PAS1 can include silicon oxide (SiOx) having a low hydrogen concentration, and the second passivation layer PAS2 can include silicon nitride (SiNx) having a higher hydrogen concentration than the first passivation layer PAS1. The planarization layer PNL can also include at least one organic insulating material of an acryl-based resin, an epoxy-based resin, a siloxane-based resin, a polyimide-based resin, and a polyamide-based resin.

Any one of the pixel electrode PX arranged in the pixel area and the common electrode COM can include a plurality of slits that overlap the other electrode, and a fringe electric field can be applied to the liquid crystal layer so that the liquid crystal layer can be driven in an FFS mode. Further, the pixel electrode PX and the common electrode VCOM can be formed of a transparent conductive layer. For example, the transparent conductive layer can include any one of indium tin oxide (ITO) and indium zinc oxide (IZO).

In addition, the common electrode VCOM can overlap the gate line GL with the plurality of insulating layers ILD1, ILD2, PAS1 and PNL interposed therebetween, and can overlap the data line DL with the plurality of insulating layers PAS1 and PNL interposed therebetween. The common electrode VCOM can also serve as a touch electrode. Further, the pixel electrode PXL can be connected to the second source-drain electrode SD2 of the thin film transistor TFT through the contact hole CH3 passing through the second passivation layer PAS2, the planarization layer PNL and the first passivation layer PAS1.

In addition, the gate lines GLi and GL(i+1) can be driven by a single feeding manner or an interlacing manner. For example, one GLi of the gate lines GLi and GL(i+1) can be connected to the second gate driving circuit 200b (FIG. 3) arranged in the right bezel area, and the other GL(i+1) can be connected to the first gate driving circuit 200a (FIG. 3) arranged in the left bezel area. Also, the thin film transistors TFT respectively connected to the adjacent gate lines GLi and GL(i+1) can be extended between the adjacent gate lines GLi and GL(i+1), and can be connected to the pixel electrodes PXL extended between the adjacent gate lines GLi and GL(i+1).

Each of the gate lines GLi and GL(i+1) driven by a single feeding manner or an interlacing manner can also include a start end contacting the gate driving circuit (FIG. 2:200 or 3: 200a or 200b) in one bezel area and an end not contacting the gate driving circuit (FIG. 2:200 or FIG. 3: 200a or 200b) in the other bezel area. In addition, the display device can include a first type dummy hole DH1 arranged at the end of the gate lines GLi and GL(i+1) and used as a hydrogen degasification path.

The display device can further include at least one of a second type dummy hole DH2 arranged on a signal line adjacent to the thin film transistor TFT in the display area, that is, the gate lines GLi and GL(i+1) and a third type dummy hole DH3 arranged on the data line DL. Further, the display device can include a plurality of fourth type dummy holes DH4 arranged adjacent to the ends of the gate lines GLi and GL(i+1) in the bezel area between the ends of the gate lines GLi and GL(i+1) and the gate driving circuit.

Also, the display device can further include dummy electrodes DM1, DM2, DM3 and DM4 respectively arranged in the dummy holes DH1, DH2, DH3 and DH4. In particular, the dummy electrodes DM1, DM2, DM3 and DM4 can protect the signal lines GL and DL exposed through the dummy holes DH1, DH2, DH3 and DH4.

In addition, the dummy holes DH1, DH2, DH3 and DH4 can be used as hydrogen degasification paths through which hydrogen (H) included in a plurality of layers is diffused and degasified in a heat treatment process, together with the contact holes CH2 and CH3 of the thin film transistor TFT, thereby increasing hydrogen degasification. That is, the dummy holes DH1, DH2, DH3 and DH4 arranged at the ends of the gate lines GLi and GL(i+1) and adjacent areas thereof can increase the degasification of hydrogen (H) flowing through the ends of the gate lines GLi and GL(i+1) and the gate insulating layer GI. Accordingly, hydrogen degasification in the display area can be increased during the heat treatment process to minimize the hydrogen effect on the thin film transistor TFT, thereby preventing or minimizing the change in the threshold voltage Vth.

Further, as the dummy holes DH1, DH2, DH3 and DH4 are closer to the ends of the gate lines GLi and GL(i+1), the number and density of the dummy holes DH1, DH2, DH3 and DH4 can be increased to minimize the difference in hydrogen inflow according to the distance from the ends of the gate lines GLi and GL(i+1). Accordingly, the display device can minimize the deviation of the threshold voltage Vth of the thin film transistor TFT according to the distance from the ends of the gate lines GLi and GL(i+1).

Next, referring to FIG. 8A, the first type dummy hole DH1 can pass through the plurality of insulating layers stacked on the gate line GL to expose the end of the gate line GL. Also, the second type dummy hole DH2 can be arranged on the gate line GL in the same structure as that of the first type dummy hole DH1. Further, the first type and second type dummy holes DH1 and DH2 can have a structure passing through the interlayer insulating layers ILD1 and ILD2, the first passivation layer PAS1, the planarization layer PNL and the second passivation layer PAS2 on the gate line GL. As shown in FIG. 8A, the display device can further include dummy electrodes DM1 and DM2 arranged in the first type and second type dummy holes DH1 and DH2, respectively, to contact the gate line GL. In particular, the dummy electrodes DM1 and DM2 can be arranged on the second passivation layer PAS2, and can be in contact with the gate line GL via the first type and second type dummy holes DH1 and DH2, respectively. The dummy electrodes DM1 and DM2 can also be formed of the same transparent conductive layer in the same process as that of the pixel electrode PXL, and can protect the gate line GL exposed through the dummy holes DH1 and DH2.

Referring to FIG. 8B, the third type dummy hole DH3 can pass through the plurality of insulating layers stacked on the data line DL to expose the data line DL. In particular, the third type dummy hole DH3 can have a structure passing through the first passivation layer PAS1, the planarization layer PNL and the second passivation layer PAS2 on the data line DL. As shown, the display device can further include a dummy electrode DM3 arranged in the third type dummy hole DH3 to contact the data line DL. In more detail, the dummy electrode DM3 can be arranged on the second passivation layer PAS2, and can be in contact with the data line DL via the third type dummy hole DH3. The dummy electrode DM3 can also be formed of the same transparent conductive layer in the same process as that of the pixel electrode PXL, and can protect the data line DL exposed through the dummy holes DH1 and DH2.

Also, the plurality of fourth type dummy holes DH4 arranged in the bezel area adjacent to the end of the gate lines GLi and GL(i+1) can have any one of various structures such as (4-1)th to (4-6)th type dummy holes DH41 to DH46 shown in FIGS. 9A to 9F.

Figure 9A:
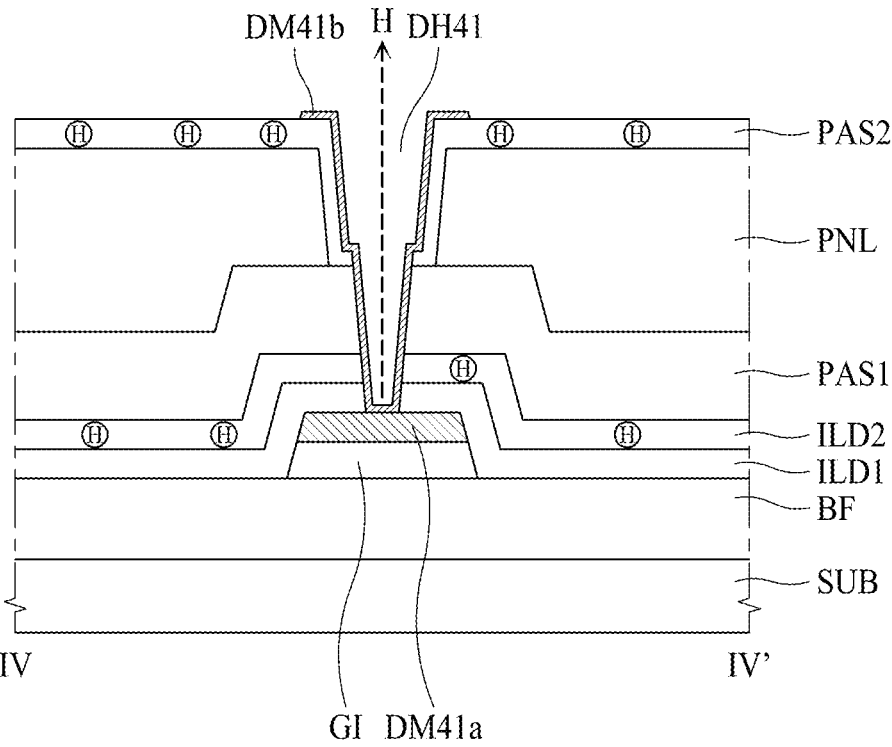
FIGS. 9A to 9F are cross-sectional views illustrating a dummy hole structure taken along a line IV-IV' shown in FIG. 6.

Referring to FIG. 9A, the display device can include a (4-1)th type dummy hole DH41 arranged in the bezel area adjacent to the end of the gate lines GLi and GL(i+1), and a plurality of dummy electrodes DM41a and DM41b which are in contact with each other through the (4-1)th type dummy hole DH41. The plurality of dummy electrodes DM41a and DM41b can have an electrically floated structure.

Figure 9B:
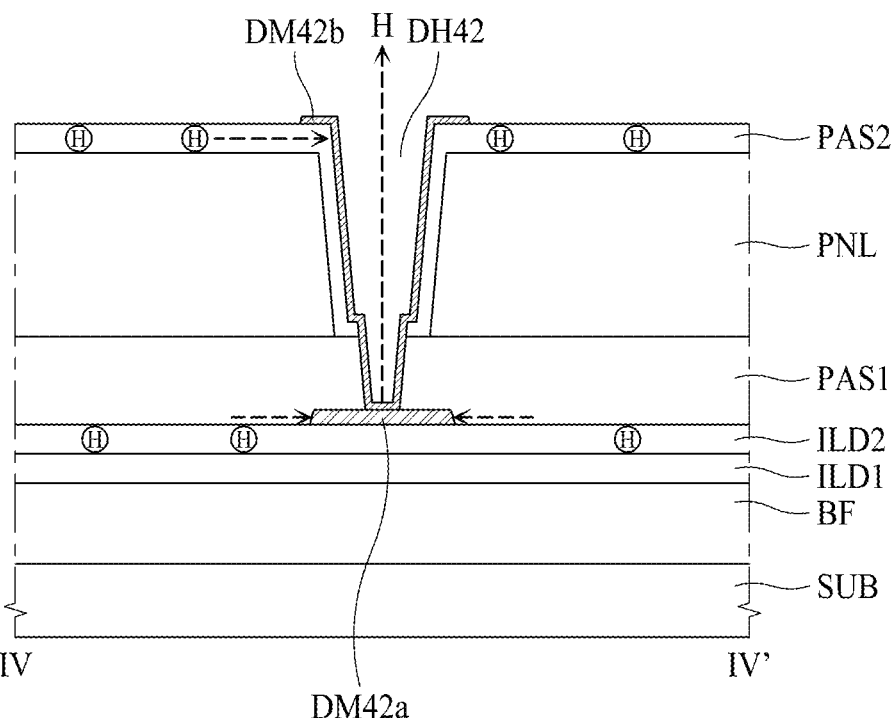

In addition, the (4-1)th type dummy hole DH41 can have a structure that passes through the interlayer insulating layers ILD1 and ILD2, the first passivation layer PAS1, the planarization layer PNL and the second passivation layer PAS2 in the same manner as the first and second type dummy holes DH1 and DH2 on the gate line GL. The dummy electrode DM41a arranged on the gate insulating layer GI can also be formed of the same gate metal layer in the same process as that of the gate line GL. Further, the dummy electrode DM41b arranged on the second passivation layer PAS2, passing through the (4-1)th type dummy hole DH41 can be formed of the same transparent conductive layer in the same process as that of the pixel electrode PXL to protect the dummy electrode DM41a exposed through the dummy hole DH41. Referring to FIG. 9B, the display device can include a (4-2)th type dummy hole DH42 arranged in the bezel area adjacent to the end of the gate lines GLi and GL(i+1), and a plurality of dummy electrodes DM42a and DM42b which are in contact with each other through the (4-2)th type dummy hole DH42. The plurality of dummy electrodes DM42a and DM42b can also have an electrically floated structure.

Further, the (4-2)th type dummy hole DH42 can have a structure passing through the first passivation layer PAS1, the planarization layer PNL and the second passivation layer PAS2 in the same manner as the third dummy hole DH3 on the data line DLI. Also, the dummy electrode DM42a arranged on the interlayer insulating layer ILD2 can be formed of the same source-drain metal layer in the same process as that of the data line DL. The dummy electrode DM42b arranged in the second passivation layer PAS2, passing through the (4-2)th type dummy hole DH42 can also be formed of the same transparent conductive layer in the same process as that of the pixel electrode PXL to protect the dummy electrode DM42a exposed through the dummy hole DH42.

Figure 9C:
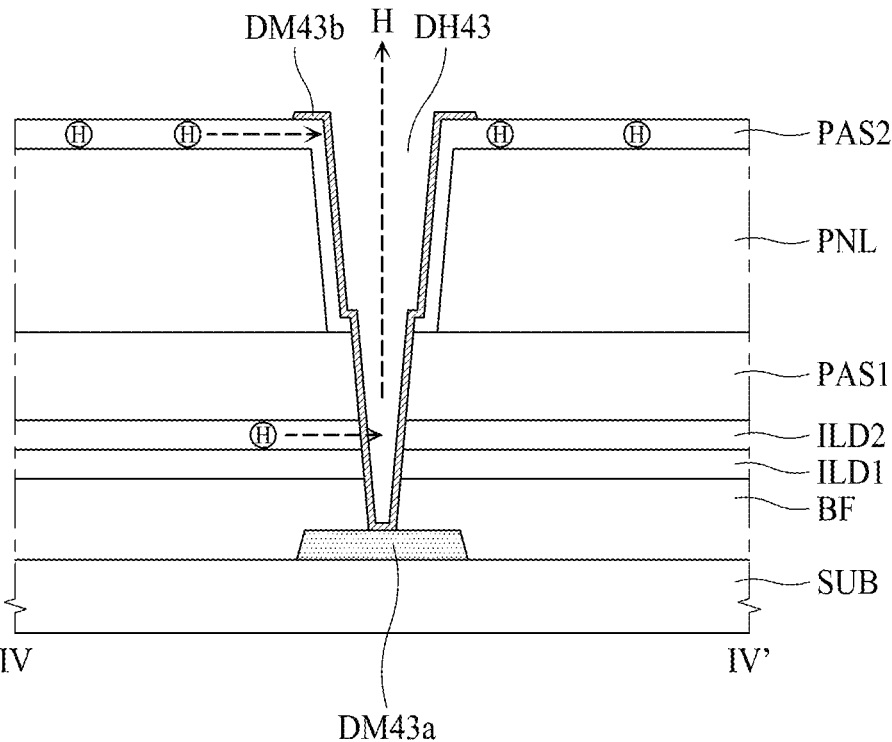

Referring to FIG. 9C, the display device can include a (4-3)th type dummy hole DH43 arranged in the bezel area adjacent to the end of the gate lines GLi and GL(i+1), and a plurality of dummy electrodes DM43a and DM43b which are in contact with each other through the (4-3)th type dummy hole DH43. The plurality of dummy electrodes DM43a and DM43b can also have an electrically floated structure. Further, the (4-3)th type dummy hole DH43 can have a structure passing through the buffer layer BF, the interlayer insulating layers ILD1 and ILD2, the first passivation layer PAS1, the planarization layer PNL and the second passivation layer PAS2, which are stacked on the substrate SUB.

In addition, the dummy electrode DM43a arranged on the substrate SUB can be formed of the same light shield metal layer in the same process as that of the light shield electrode LS. Also, the dummy electrode DM43b arranged on the second passivation layer PAS2, passing through the (4-3)th type dummy hole DH43 can be formed of the same transparent conductive layer in the same process as that of the pixel electrode PXL to protect the dummy electrode DM43a exposed through the dummy hole DH43.

Figure 9D:
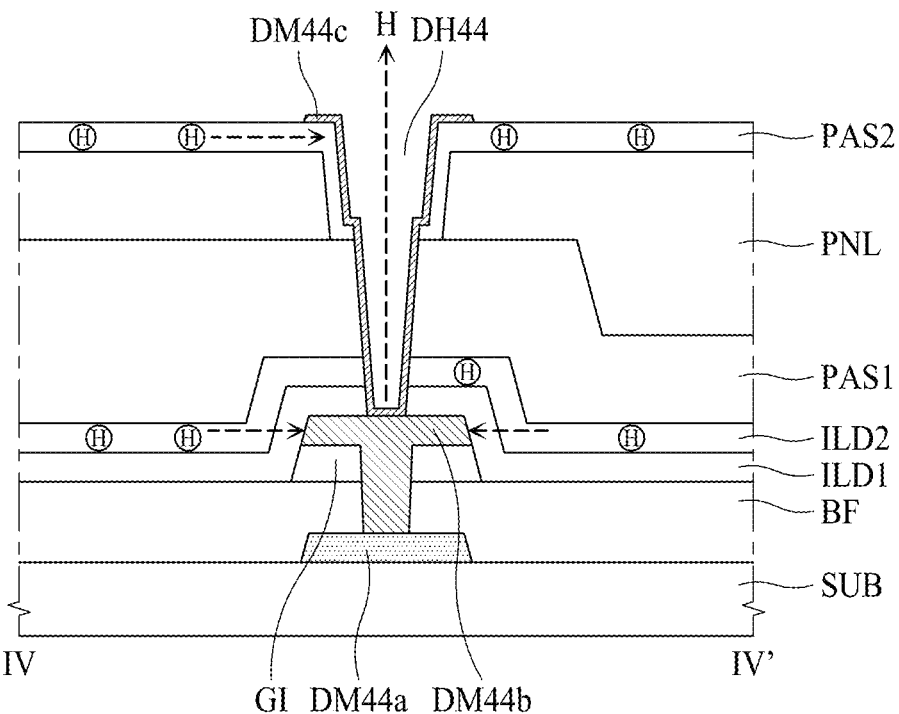

Referring to FIG. 9D, the display device can include a (4-4)th type dummy hole DH44 arranged in the bezel area adjacent to the end of the gate lines GLi and GL(i+1), and a plurality of dummy electrodes DM44a, DM44b and DM44c which are in contact with each other through the (4-4)th type dummy hole DH44. Also, the plurality of dummy electrodes DM44a, DM44b and DM44c can have an electrically floated structure. The (4-4)th type dummy hole DH44 can also have a structure passing through the interlayer insulating layers ILD1 and ILD2, the first passivation layer PAS1, the planarization layer PNL and the second passivation layer PAS2.

Further, the dummy electrode DM44a arranged on the substrate SUB can be formed of the same light shield metal layer in the same process as that of the light shield electrode LS. In addition, the dummy electrode DM44b arranged on the gate insulating layer GI can be formed of the same gate metal layer in the same process as that of the gate line GL, and can be in contact with the dummy electrode DM44a through a contact hole passing through the gate insulating layer GI and the buffer layer BF. Also, the dummy electrode DM44c arranged on the second passivation layer PAS2, passing through the (4-4)th type dummy hole DH44 can be formed of the same transparent conductive layer in the same process as that of the pixel electrode PXL to protect the dummy electrode DM44b through the dummy hole DH44.

Figure 9E:
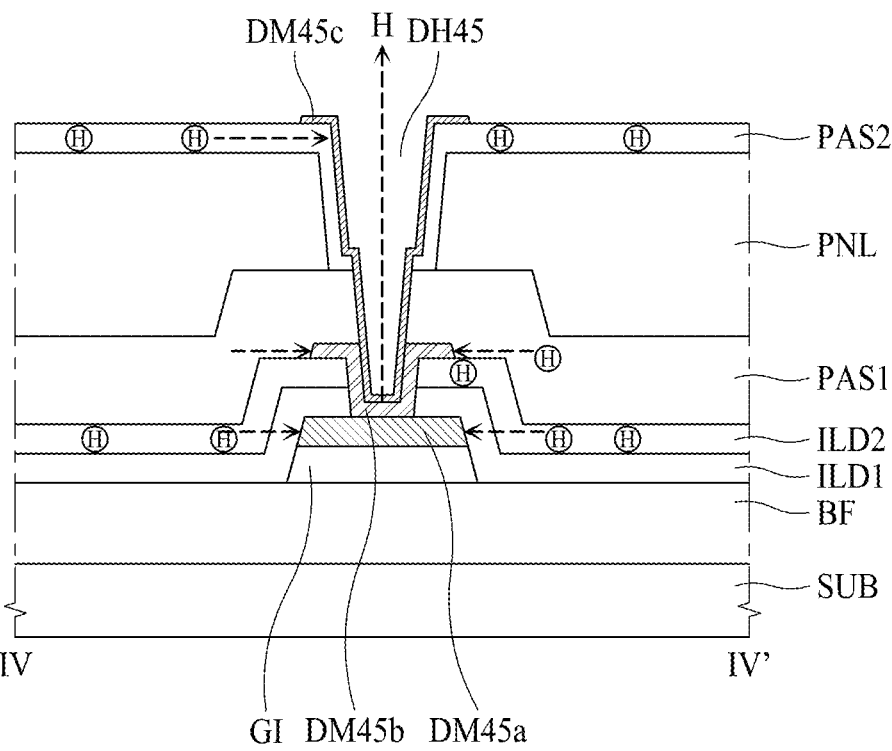

Referring to FIG. 9E, the display device can include a (4-5)th type dummy hole DH45 arranged in the bezel area adjacent to the end of the gate lines GLi and GL(i+1), and a plurality of dummy electrodes DM45a, DM45b and DM45c contacting one another each other through the (4-5)th type dummy hole DH45. The plurality of dummy electrodes DM45a, DM45b and DM45c can also have an electrically floated structure. Further, the (4-5)th type dummy hole DH45 can have a structure passing through the interlayer insulating layers ILD1 and ILD2, the first passivation layer PAS1, the planarization layer PNL and the second passivation layer PAS2.

In addition, the dummy electrode DM45a arranged on the gate insulating layer GI can be formed of the same gate metal layer in the same process as that of the gate line GL. The dummy electrode DM45b arranged on the second interlayer insulating layer ILD2 can also be formed of the same source-drain metal layer in the same process as that of the data line DL, and can contact the dummy electrode DM45a through a contact hole passing through the interlayer insulating layers ILD2 and ILD1. The dummy electrode DM45c arranged in the second passivation layer PAS2, passing through the (4-5)th type dummy hole DH45 can also be formed of the same transparent conductive layer in the same process as the pixel electrode PXL to protect the dummy electrode DM45b exposed through the dummy hole DH45.

Figure 9F:
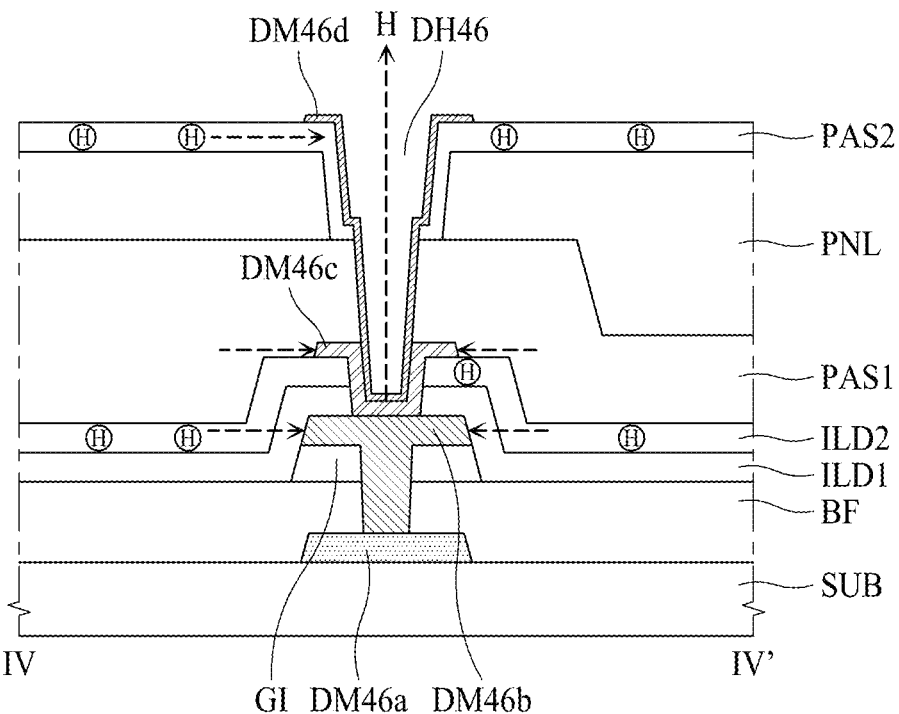

Referring to FIG. 9F, the display device can include a (4-6)th type dummy hole DH46 arranged in the bezel area adjacent to the end of the gate lines GLi and GL(i+1), and a plurality of dummy electrodes DM46a, DM46b, DM46c and DM46d which are in contact with one another through the (4-6)th type dummy hole DH46. Further, the plurality of dummy electrodes DM46a, DM46b, DM46c and DM46d can have an electrically floated structure.

In addition, the (4-6)th type dummy hole DH46 can have a structure passing through the interlayer insulating layers ILD1 and ILD2, the first passivation layer PAS1, the planarization layer PNL and the second passivation layer PAS2. The dummy electrode DM46a arranged on the substrate SUB can also be formed of the same light shield metal layer in the same process as that of the light shield electrode LS. Further, the dummy electrode DM46b arranged on the gate insulating layer GI can be formed of the same gate metal layer in the same process as that of the gate line GL, and can contact the dummy electrode DM46a through a contact hole passing through the gate insulating layer GI and the buffer layer BF. The dummy electrode DM46c arranged on the second interlayer insulating layer ILD2 can also be formed of the same source-drain metal layer in the same process as that of the data line DL, and can contact the dummy electrode DM46b through a contact hole passing through the interlayer insulating layers ILD2 and ILD1. Also, the dummy electrode DM46d arranged on the second passivation layer PAS2, passing through the (4-6)th type dummy hole DH46 can be formed of the same transparent conductive layer in the same process as that of the pixel electrode PXL to protect the dummy electrode DM46c exposed through the dummy hole DH46. Herein, as shown in FIGS. 9A to 9F, the dummy electrodes DM41a, DM42a, DM43a, DM44a, DM44b, DM45a, DM45b, DM46a, DM46b arranged below the fourth type dummy hole may be referred to as a fifth dummy electrode.

In the display device according to an embodiment, various types of dummy holes DH1, DH2, DH3 and DH4: DH41 to DH46 and dummy electrodes DM1, DM2, DM3 and DM4; DM41a to DM46d can be used as degasification paths for hydrogen (H) diffused from multiple layers including the active layer ACT and the insulating layers ILD2 and PAS2 during the heat treatment process to increase hydrogen degasification.

Further, the light shield metal layer used as the light shield electrode LS and the dummy electrodes DM43a, DM44a and DM46a, the gate metal layer used as the gate line GL, the gate electrode GE and the dummy electrodes DM41a, DM44b, DM45a and DM46b, and the source-drain metal layer used as the data line DL, the source-drain electrodes SD1 and SD2 and the dummy electrodes DM42a, DM45b and DM46c can include a hydrogen capture metal material that captures hydrogen, thereby suppressing hydrogen diffusion. The hydrogen capture metal material can include a metal material having a negative (–) hydrogen generation energy (eV).

For example, the hydrogen capture metal material can include at least one of molybdenum titanium alloy (MoTi), titanium (Ti), lithium (Li), hafnium (Hf), ruthenium (Lu), tantalum (Ta), magnesium (Mg), vanadium (V), rubinium (Rb), scandium (Sc), strontium (Sr), yttrium (Y), zirconium (Zr), niobium (Nb), cesium (Cs), barium (Ba) and lanthanum (La).

Figure 10:
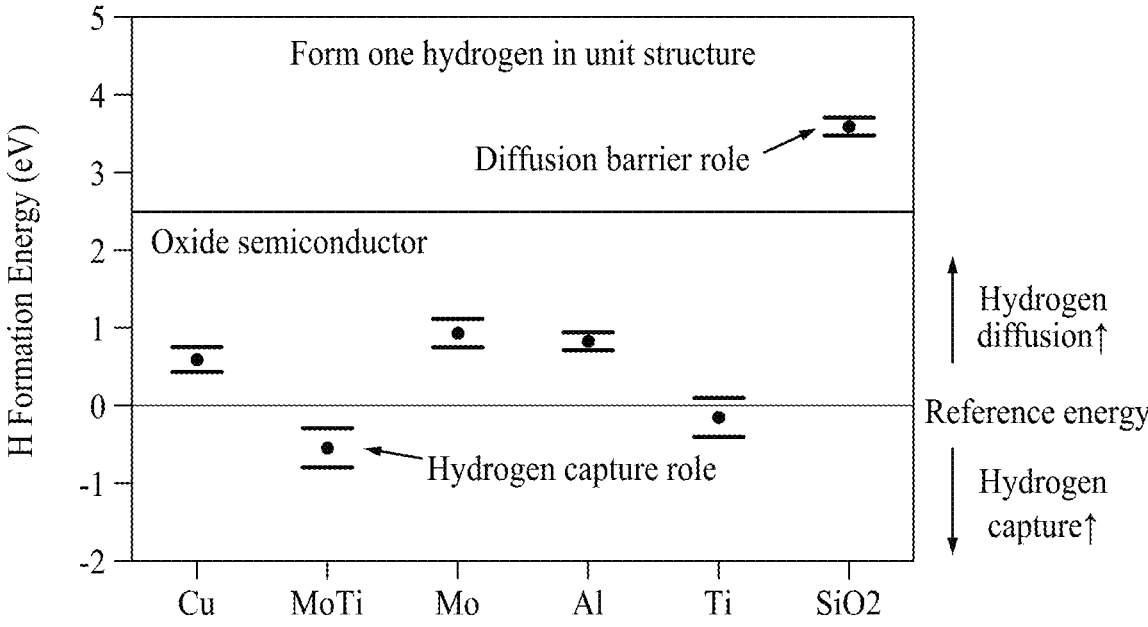
FIG. 10 is a graph illustrating a hydrogen generation energy for each material used in a display device according to an embodiment of the present disclosure.
Figure 11:
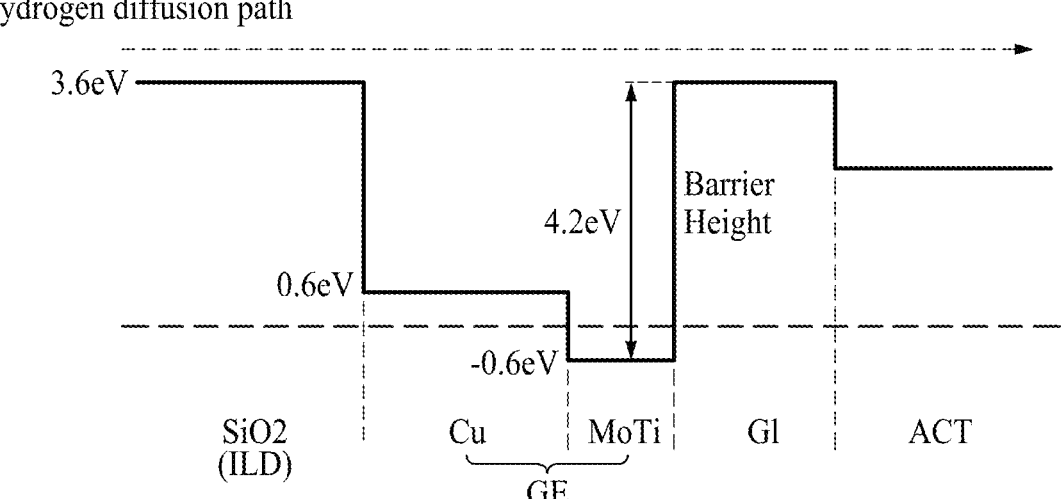
FIG. 11 is a view illustrating a hydrogen diffusion path of a thin film transistor in a display device according to an embodiment of the present disclosure.
Figure 12:
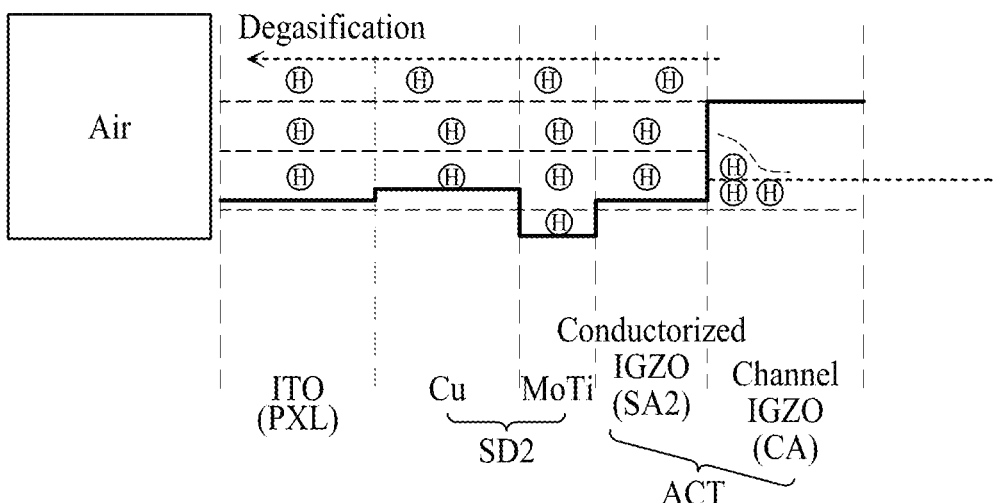
FIG. 12 is a view illustrating a hydrogen degasification path of a thin film transistor according to an embodiment of the present disclosure.

Next, FIG. 10 is a graph illustrating a hydrogen generation energy for each material used in a display device, FIG. 11 is a view illustrating a hydrogen diffusion path of a thin film transistor in a display device, and FIG. 12 is a view illustrating a hydrogen degasification path of a thin film transistor according to an embodiment of the present disclosure. In the materials used in the display panel, hydrogen density diffusion to a layer adjacent to a corresponding material layer can occur depending on the amount of hydrogen and an intrinsic hydrogen generation energy eV of the corresponding layer during the process.

Referring to FIG. 10, a molybdenum-titanium alloy (MoTi) among materials (Cu, MoTi, Mo, Al and Ti) used in the gate metal layer or the source-drain metal layer can have a negative (–) hydrogen generation energy of –0.6 eV, and can serve as a hydrogen capture role. Silicon oxide (SiOx), which is used in the interlayer insulating layer ILD1 or the gate insulating layer GI and has a relatively high hydrogen generation energy of 3.6 eV can serve as a barrier for suppressing hydrogen diffusion.

Referring to FIG. 11, hydrogen diffused from the passivation layer PAS2 can be diffused to the active layer ACT via the interlayer insulating layer ILD, the gate electrode GE and the gate insulating layer GI of the thin film transistor. The interlayer insulating layer ILD and the gate insulating layer GI, which include silicon oxide (SiOx) having a high hydrogen generation energy of 3.6 eV, can function as a barrier for suppressing hydrogen diffusion.

Further, the gate electrode GE can have a multi-layered structure in which a lower gate metal layer including a molybdenum-titanium alloy (MoTi) and an upper gate metal layer including copper (Cu) are stacked. The lower gate metal layer including a molybdenum-titanium alloy (MoTi) having a negative hydrogen generation energy of –0.6 eV can capture hydrogen diffused through the upper gate metal layer including copper (Cu) having a positive hydrogen generation energy of 0.6V to suppress hydrogen diffusion into the gate insulating layer GI and the active layer ACT.

In one embodiment, the dummy electrodes DM41a, DM42a, DM43a, DM44a, DM44b, DM45a, DM45b, DM46a, DM46b and DM46c are formed of a light shield metal layer, a gate metal layer or a source-drain metal layer, which contains a hydrogen capture metal material such as a molybdenum-titanium alloy (MoTi), to suppress hydrogen diffusion, thereby reducing the hydrogen effect on the thin film transistor TFT.

Referring to FIG. 12, in the thin film transistor according to an embodiment, hydrogen (H) included in the channel area CA (IGZO) of the active layer ACT can be degasified into the contact holes CH2 (Air) via the second connection area SA2 (the Conductorized IGZO) of the active layer ACT, the second source-drain electrodes SD2 (Cu/MoTi) and the pixel electrode PXL (ITO). The second connection area SA2 (the Conductorized IGZO) of the active layers ACT, the second source-drain electrodes SD2 (Cu/MoTi) and the pixel electrode PXL (ITO) can have a lower hydrogen generation energy than the channel area CA (IGZO) of the active layer ACT.

Thus, the display device according to an embodiment can reduce the hydrogen effect on the thin film transistor TFT by increasing hydrogen degasification and hydrogen capture through the dummy holes DH1, DH2, DH3 and DH4: DH41 to DH46 and the dummy electrodes DM1, DM2, DM3 and DM4: DM41a to DM46d.

Figure 13:
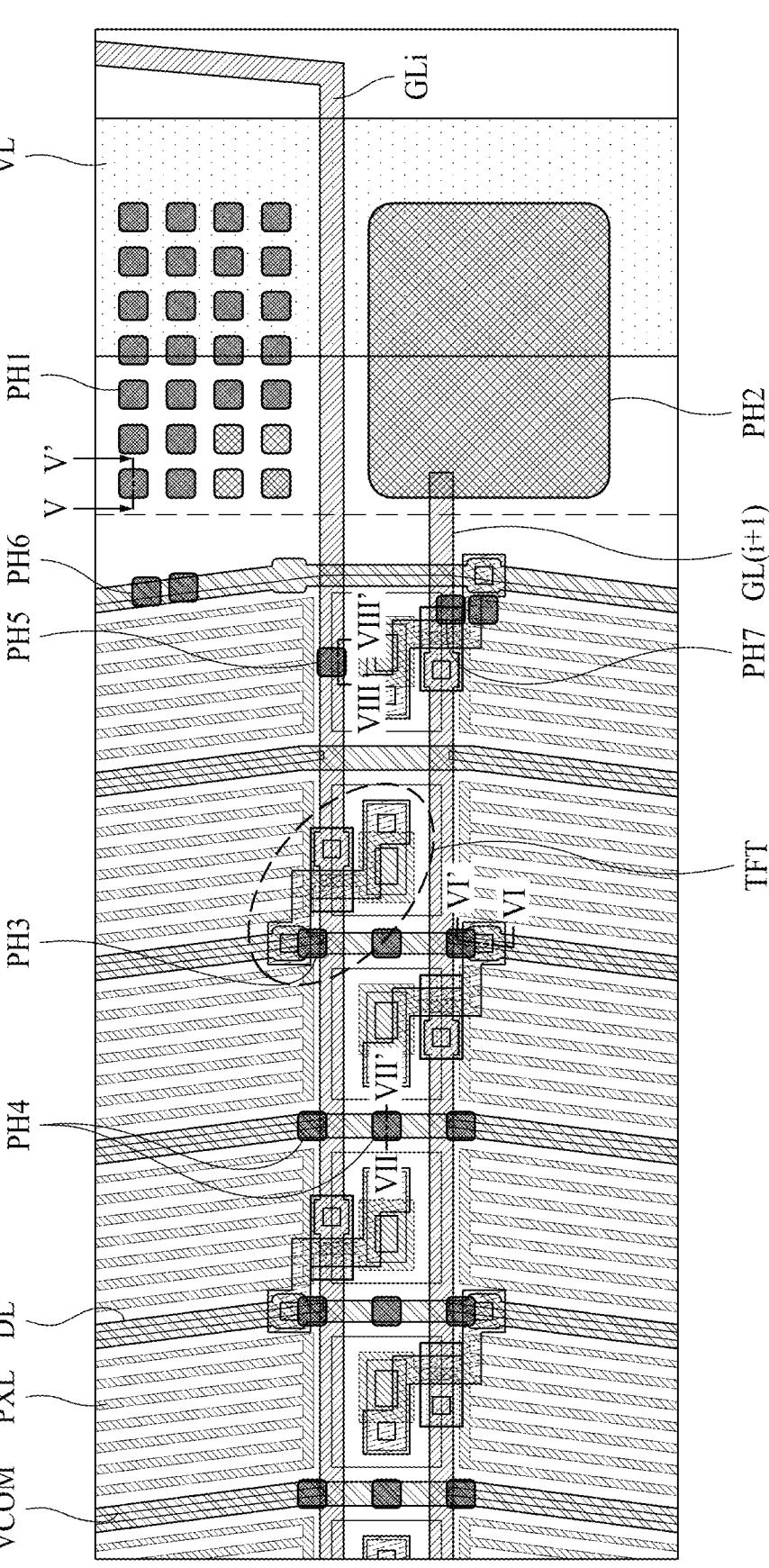
FIG. 13 is a plan view illustrating a partial area adjacent to an end of a gate line in a display area of a display device according to an embodiment of the present disclosure.
Figure 14A:
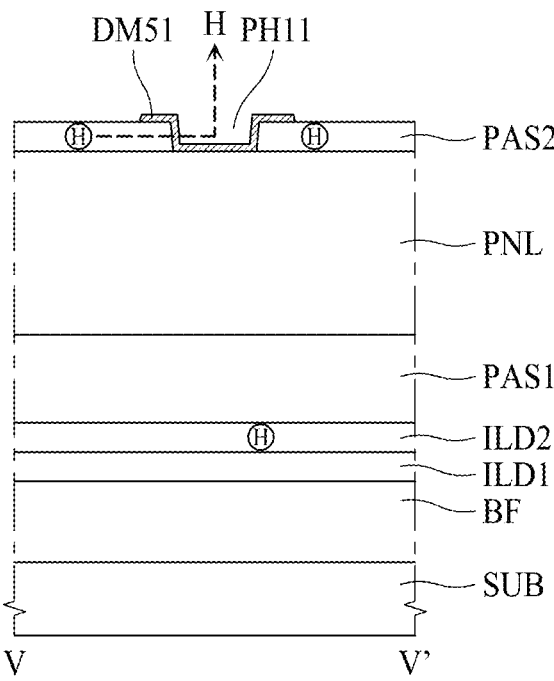
FIGS. 14A to 14F are cross-sectional views illustrating a passivation hole structure taken along lines V-V', VI-VI', VII-VII' and VIII-VIII' shown in FIG. 13.
Figure 14B:
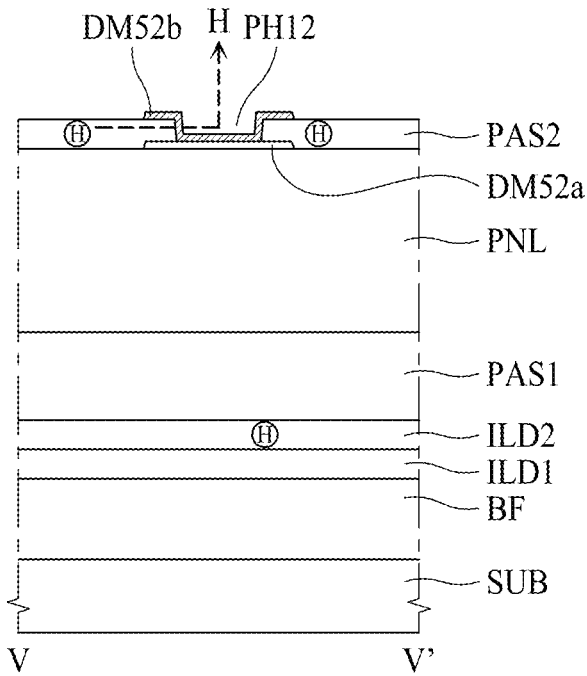
Figure 14C:
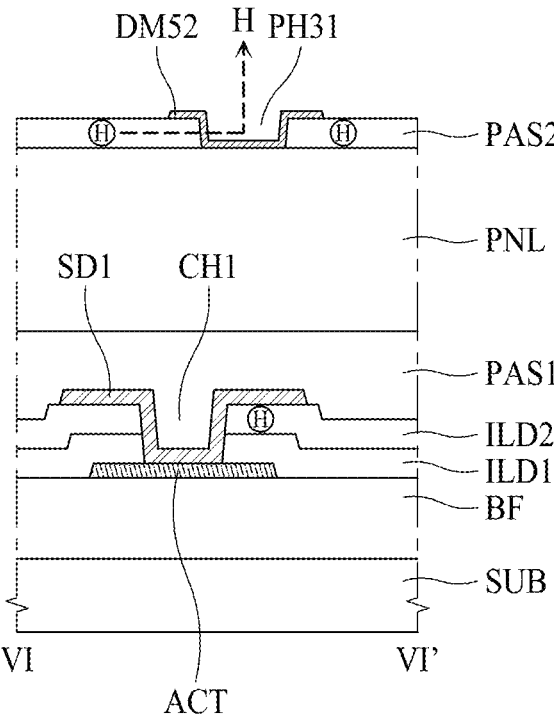
Figure 14D:
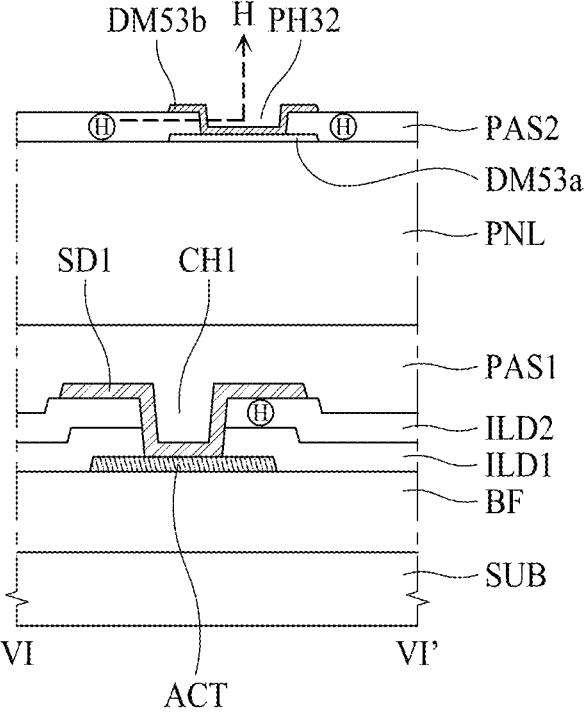
Figure 14E:
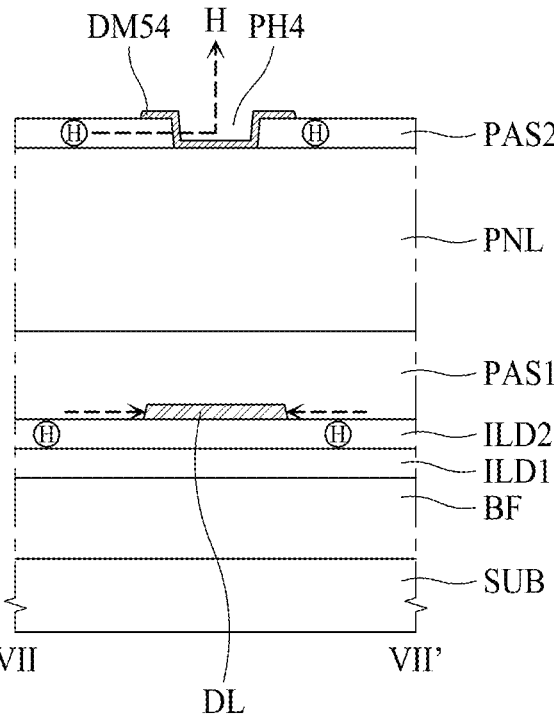
Figure 14F:
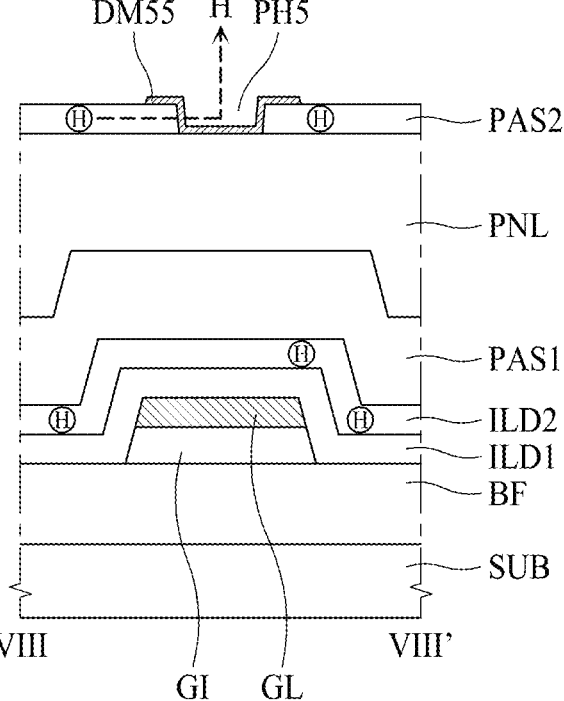
Figure 15A:
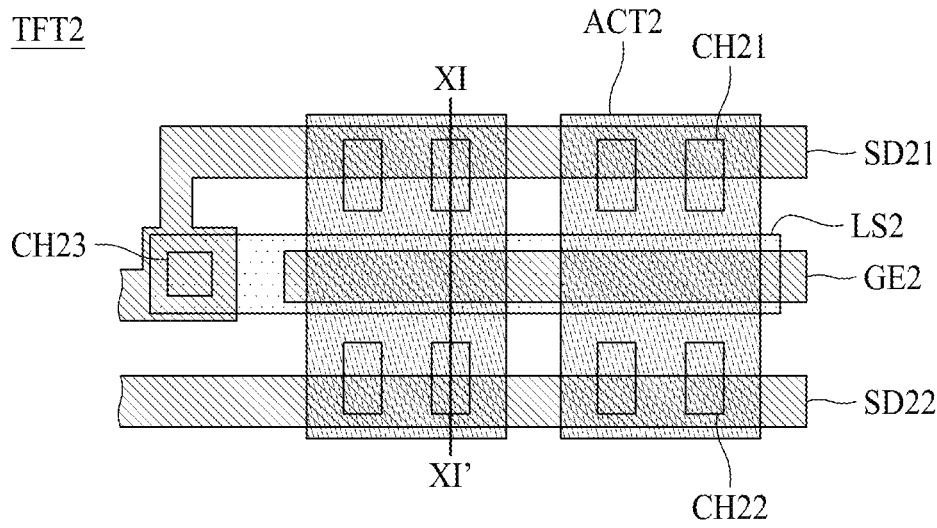
FIGS. 15A and 15B are a plan view and a cross-sectional view illustrating a thin film transistor structure in a gate driving circuit of a display device according to an embodiment of the present disclosure.
Figure 15B:
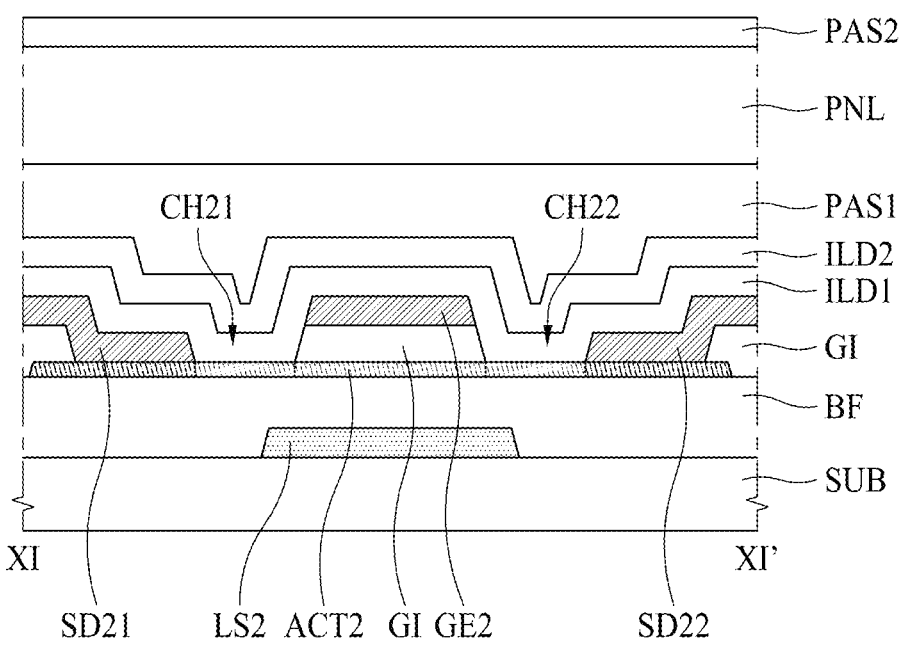

Next, FIG. 13 is a plan view illustrating a partial area adjacent to an end of a gate line in a display area of a display device, FIGS. 14A to 14F are cross-sectional views illustrating a passivation hole structure taken along lines V-V', VI-VI', VII-VIII' and VIII-VIII' shown in FIG. 13, and FIGS. 15A and 15B are a plan view and a cross-sectional view illustrating a thin film transistor structure in a gate driving circuit of a display device according to an embodiment of the present disclosure.

The display device shown in FIG. 13 can include passivation holes PH1 to PH7 used as hydrogen degasification paths. In contrast to the display device shown in FIG. 6, because elements including passivation holes PH1 to PH7 instead of the dummy holes DH1, DH2, DH3 and DH4 are different from those of FIG. 6 and the other elements are the same as those of FIG. 6, only the different elements will be described.

In more detail, the display device can include at least one of passivation holes PH1 and PH2 arranged in the second passivation layer PAS2 that overlaps or is adjacent to the end of the gate lines GLi and GL(i+1) driven by the single feeding manner or the interlacing manner. The passivation hole PH1 can be arranged in the second passivation layer PAS2 by being divided into a plurality of portions, which overlaps or is adjacent to the end of the gate lines GLi and GL(i+1). In addition, the passivation hole PH2 can be integrally arranged in the second passivation layer PAS2 that overlaps or is adjacent to the end of the gate lines GLi and GL(i+1).

The display device can further include at least one of passivation holes PH3 and PH7 arranged in the second passivation layer PAS2 that overlaps or is adjacent to the thin film transistor TFT in the display area, passivation holes PH4 and PH6 arranged in the second passivation layer PAS2 on a signal line adjacent to the thin film transistor TFT, that is, the data line DL, or a passivation hole PH5 arranged in the second passivation layer PAS2 on the gate lines GLi and GL(i+1).

Also, the display device can include at least one of passivation holes PH1 to PH7 and can further include a dummy electrode arranged to overlap the passivation holes PH1 to PH7 and electrically floated. Herein, the passivation holes PH3, PH4, PH5, PH6, and PH7 provided in the second passivation layer PAS2 (i.e., an upper passivation layer) in the display area may be referred to as first passivation holes, and the passivation holes PH1, PH2 provided in the second passivation layer PAS2 located between the distal end of each gate line and the gate driving circuit in the bezel area may be referred to as second passivation holes.

Referring to FIG. 14A, the display device can include a passivation hole PH11 arranged in the second passivation layer PAS2 adjacent to the end of the gate lines GLi and GL(i+1) and a dummy electrode DM51 arranged to overlap the passivation hole PH11. In addition, the dummy electrode DM51 can be formed of the same transparent conductive layer as the pixel electrode PXL on the second passivation layer PAS2 and the planarization layer PNL.

Referring to FIG. 14B, the display device can include a passivation hole PH12 arranged in the second passivation layer PAS2 adjacent to the end of the gate lines GLi and GL(i+1) and dummy electrodes DM52a and DM52b arranged to overlap the passivation hole PH12. Further, the dummy electrode DM52a can be formed of the same transparent conductive layer as the common electrode VCOM on the planarization layer PNL. The dummy electrode DM52b can also be formed of the same transparent conductive layer as the pixel electrode PXL on the second passivation layer PAS2 and the dummy electrode DM52a, and can be in contact with the dummy electrode DM52a through the passivation hole PH12.

Referring to FIG. 14C, the display device can include a passivation hole PH31 arranged in the second passivation layer PAS2 on the thin film transistor TFT and a dummy electrode DM52 arranged to overlap the passivation hole PH31. The passivation hole PH31 can be arranged to overlap the first source-drain electrode SD1 connected to the active layer ACT of the thin film transistor TFT. In addition, the dummy electrode DM52 can be formed of the same transparent conductive layer as the pixel electrode PXL on the second passivation layer PAS2 and the planarization layer PNL.

Referring to FIG. 14D, the display device can include a passivation hole PH32 arranged in the second passivation layer PAS2 on the thin film transistor TFT and dummy electrodes DM53a and DM53b arranged to overlap the passivation hole PH32. The passivation hole PH32 can be arranged to overlap the first source-drain electrode SD1 connected to the active layer ACT of the thin film transistor TFT. In addition, the dummy electrode DM53a can be formed of the same transparent conductive layer as the common electrode VCOM on the planarization layer PNL. Also, the dummy electrode DM53b can be formed of the same transparent conductive layer as the pixel electrode PXL on the second passivation layer PAS2 and the dummy electrode DM53a, and can be in contact with the dummy electrode DM53a through the passivation hole PH32.

Referring to FIG. 14E, the display device can include a passivation hole PH4 arranged in the second passivation layer PAS2 on the data line DL and a dummy electrode DM54 arranged to overlap the passivation hole PH4. The passivation hole PH4 can be arranged to overlap the data line DL adjacent to the thin film transistor TFT. Also, the dummy electrode DM54 can be formed of the same transparent conductive layer as the pixel electrode PXL on the second passivation layer PAS2 and the planarization layer PNL.

Referring to FIG. 14F, the display device can include a passivation hole PH5 arranged in the second passivation layer PAS2 on the gate line GL and a dummy electrode DM55 arranged to overlap the passivation hole PH5. In addition, the passivation hole PH5 can be arranged to overlap the gate line GL adjacent to the thin film transistor TFT. The dummy electrode DM55 can also be formed of the same transparent conductive layer as the pixel electrode PXL on the second passivation layer PAS2 and the planarization layer PNL. Herein, as shown in FIGS. 14A to 14F, the dummy electrodes arranged in first passivation holes may be referred to as sixth dummy electrodes, the dummy electrodes arranged in second passivation holes may be referred to as seventh dummy electrodes, the dummy electrode arranged below the first passivation hole may be referred to as an eighth dummy electrode, and the dummy electrode arranged below the second passivation hole may be referred to as a ninth dummy electrode.

In the display device according to an embodiment, the dummy electrodes DM: DM51, DM52*a*, DM52*b*, DM52, DM53*a*, DM53*b*, DM54 and DM55 cover the passivation holes PH: PH1 to PH7, PH11, PH12, PH31 and PH32, thereby preventing defects that can be caused by the passivation holes PH: PH1 to PH7, PH11, PH12, PH31 and PH32 in subsequent processes after the heat treatment process.

Further, the passivation holes PH: PH1 to PH7, PH11, PH12, PH31 and PH32 and the dummy electrodes DM: DM51, DM52*a*, DM52*b*, DM52, DM53*a*, DM53*b*, DM54 and DM55 can be used as degasification paths of hydrogen (H) included in the second passivation layer PAS2 during the heat treatment process to increase hydrogen degasification. Accordingly, hydrogen degasification in the display area can be increased during the heat treatment process to minimize the hydrogen effect on the thin film transistor TFT, thereby preventing or minimizing the change in the threshold voltage Vth.

Referring to FIGS. 15A and 15B, a thin film transistor TFT2 of the gate driving circuit in the display device can have a structure different from that of the thin film transistor TFT of the display area shown in FIGS. 7 and 13. In particular, the thin film transistor TFT of the display area can have a 3-metal layer structure that includes a light shield metal layer, a gate metal layer and a source-drain metal layer as shown in FIG. 7, and the thin film transistor TFT2 of the gate driving circuit can have a 2-metal layer structure that includes a light shield metal layer and a gate metal layer as shown in FIG. 15B.

In addition, the thin film transistor TFT2 of the gate driving circuit can include a light shield electrode LS2 on the substrate SUB, a buffer layer BF covering the light shield electrode LS2, an active layer ACT2 on the buffer layer BF, a gate insulating layer GI and a gate electrode GE2, which are stacked on the active layer ACT2, and (2-1)th and (2-2)th source-drain electrodes SD21 and SD22 respectively connected to first and second connection areas of the active layer ACT2 exposed through contact holes CH21 and CH22 of the gate insulating layer GI. Also, the light shield electrode LS2 can be connected to the gate electrode GE2 through a contact hole CH23 to serve as a double gate. The display device can further include interlayer insulating layers ILD1 and ILD2, a first passivation layer PAS1, a planarization layer PNL and a second passivation layer PAS2, which are stacked on the thin film transistor TFT2 of the gate driving circuit.

Referring to FIG. 15B, the thin film transistor TFT2 of the gate driving circuit can have a structure, in which the second interlayer insulating layer ILD2 including silicon nitride (SiNx) and the source-drain electrodes SD21 and SD22 are not directly in contact with each other, and can have no contact hole passing through the first passivation layer PAS1, the planarization layer PNL and the second passivation layer PAS2.

Referring to FIG. 7, the thin film transistor TFT in the display area includes a path in which the second interlayer insulating layer ILD2 is in contact with the source-drain electrodes SD1 and SD2, and a contact hole CH3 passing through the first passivation layer PAS1, the planarization layer PNL and the second passivation layer PAS2, so that the amount of hydrogen inflow can be more increased than the thin film transistor TFT2 of the gate driving circuit.

In addition, the display device can include at least one of a dummy hole DH or a passivation hole PH, which is arranged in the display area, thereby increasing hydrogen degasification. Accordingly, the display device according to an embodiment can reduce or minimize the deviation of the threshold voltage Vth by reducing the difference in hydrogen content between the thin film transistor TFT in the display area and the thin film transistor TFT2 in the gate driving circuit.

Figure 16:
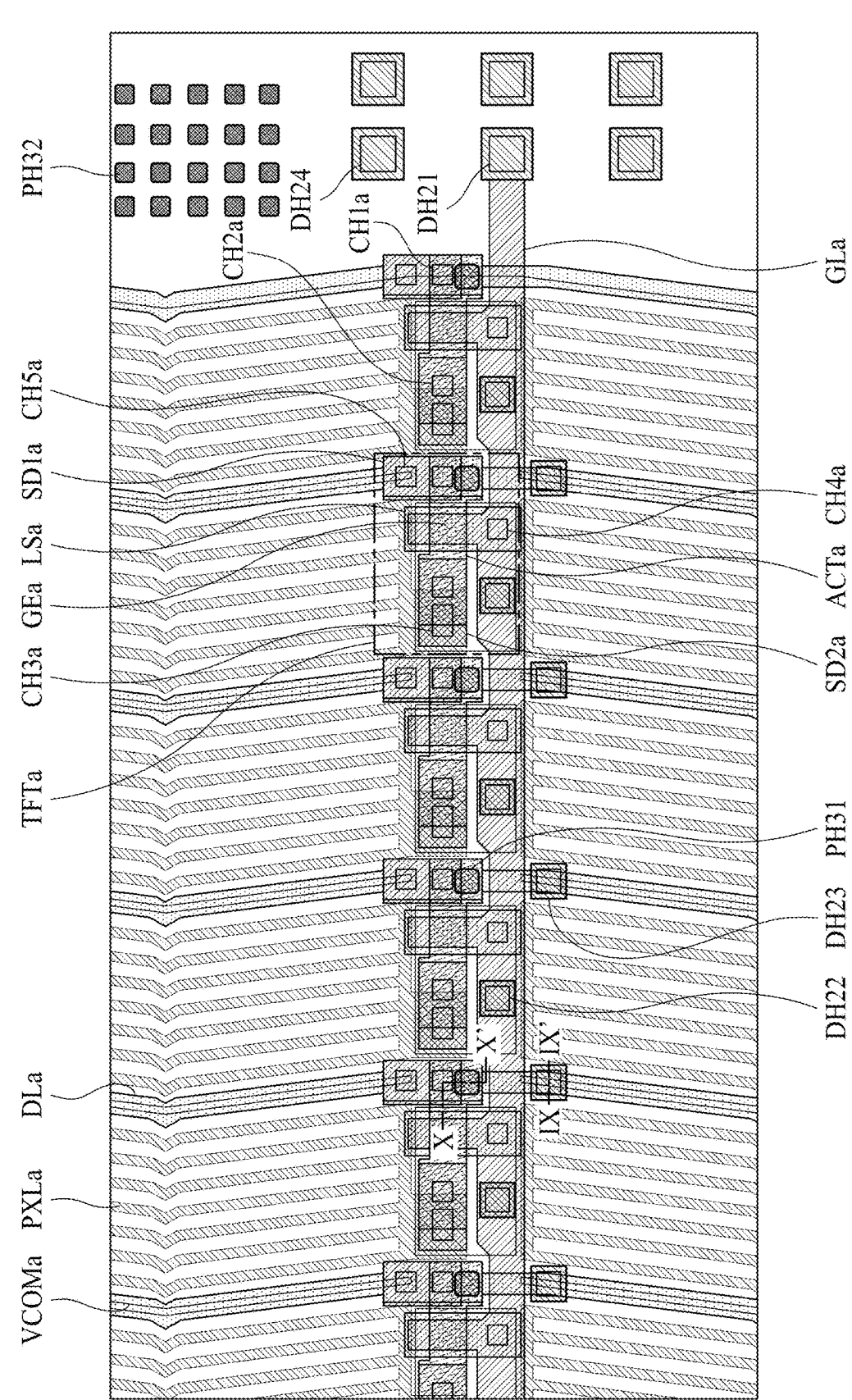
FIG. 16 is a plan view illustrating a partial area adjacent to an end of a gate line in a display area of a display device according to an embodiment of the present disclosure.
Figure 17A:
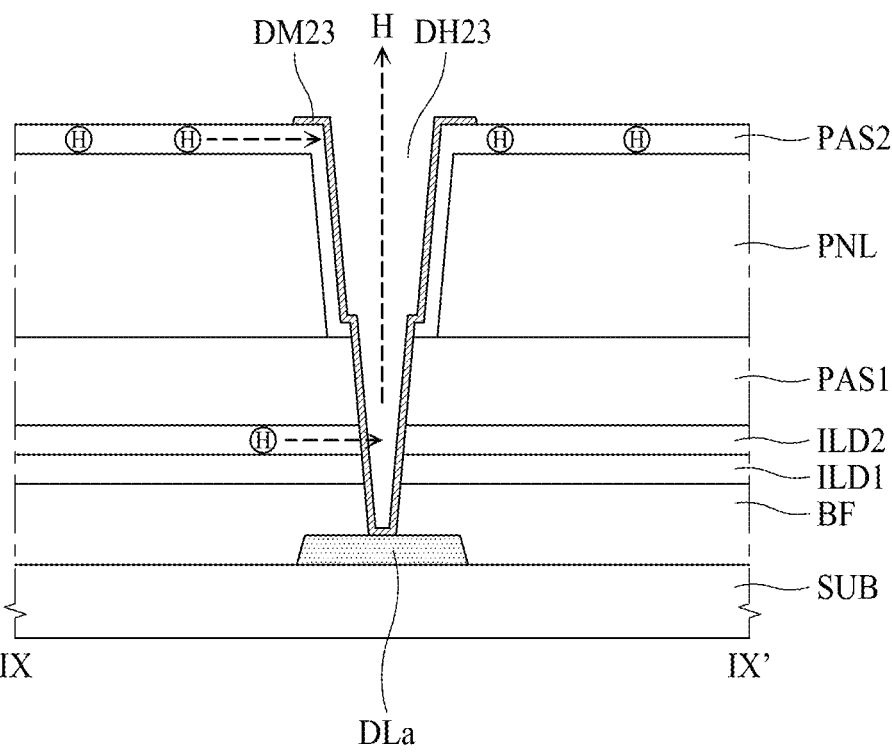
FIGS. 17A to 17C are cross-sectional views illustrating a dummy hole structure taken along line IX-IX' and a passivation hole structure taken along line X-X' shown in FIG. 16.
Figure 17B:
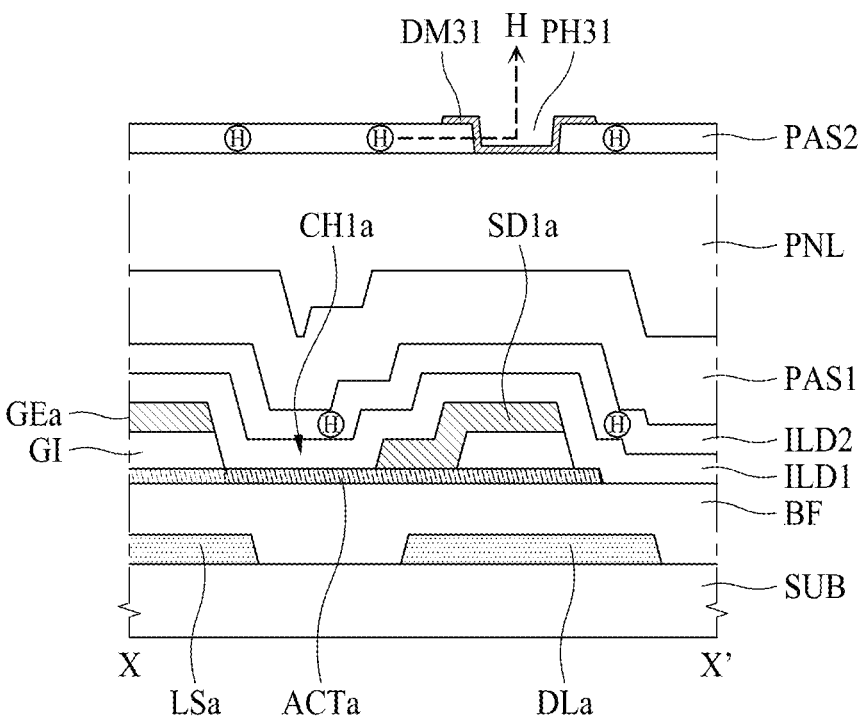
Figure 17C:
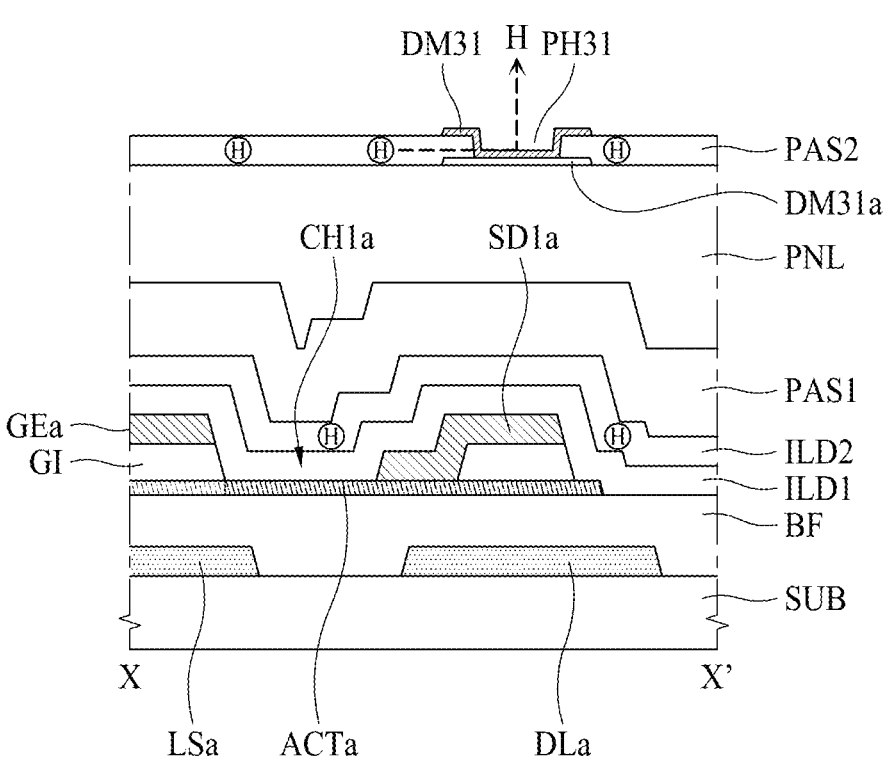

Next, FIG. 16 is a plan view illustrating a partial area adjacent to an end of a gate line in a display area of a display device, and FIGS. 17A to 17C are cross-sectional views illustrating a dummy hole structure taken along line IX-IX' and a passivation hole structure taken along line X-X' shown in FIG. 16.

Referring to FIGS. 16 to 17C, the display device can include a gate line GLa, a data line DLa, a thin film transistor TFTa, a common electrode VCOMa, a pixel electrode PXLa, and a thin film transistor substrate on which a plurality of insulating layers are arranged. In addition, the plurality of insulating layers can include a buffer layer BF, a gate insulating layer GI, interlayer insulating layers ILD1 and ILD2, passivation layers PAS1 and PAS2, and a planarization layer PNL. The description of repeated elements of those described with reference to FIGS. 6 and 7 will be omitted.

The thin film transistor TFTa in the display area can have a 2-metal layer structure. In particular, the thin film transistor TFTa in the display area can include a light shield electrode LSa on the substrate SUB, a buffer layer BF covering the light shield electrode LSa, an active layer ACTa on the buffer layer BF, a gate insulating layer GI and a gate electrode GEa, which are stacked on the active layer ACTa, and first and second source-drain electrodes SD1*a* and SD2*a* respectively connected to the first and second connection areas of the active layer ACTa exposed through the contact holes CH1*a* and CH2*a* of the gate insulating layer GI.

Further, the interlayer insulating layers ILD1 and ILD2, the first passivation layer PAS1, the planarization layer PNL and the second passivation layer PAS2 can be sequentially stacked on the thin film transistor TFTa according to an embodiment. Also, the data line DLa and the light shield electrode LSa can be arranged on the substrate SUB as the same light shield metal layer.

In addition, the gate line GLa, the gate electrode GEa, and first and second source-drain electrodes SD1*a* and SD2*a* can be formed on the gate insulating layer GI as the same gate metal layer. The gate electrode GEa can also be connected to the light shield electrode LSa through a contact hole CH4*a* passing through the gate insulating layer GI and the buffer layer BF. Further, the first source-drain electrode SD1*a* can be connected to the data line DLa through a contact hole CH5*a* passing through the gate insulating layer GI and the buffer layer BF. The second source-drain electrode SD2*a* can be connected to the pixel electrode PXL through a contact hole CH3*a* passing through the interlayer insulating layers ILD1 and ILD2, the first passivation layer PAS1, the planarization layer PNL, and the second passivation layer PAS2.

In addition, the gate line GLa driven by a single feeding manner or an interlacing manner can include a start end contacting the gate driving circuit (FIG. 2: 200 or FIG. 3:

200a or 200b) in one bezel area and an end not contacting the gate driving circuit in the other bezel area. The display device can also include at least one of dummy holes DH21, DH22, DH23 and DH24 or passivation holes PH31 and PH32, which are used as hydrogen degasification paths. The display device can further include dummy electrodes arranged to overlap the dummy holes DH21, DH22, DH23 and DH24 and the passivation holes PH31 and PH32.

Accordingly, in the display device according to an embodiment, hydrogen degasification in the display area can be increased during the heat treatment process to minimize the hydrogen effect on the thin film transistor TFTa, thereby preventing or minimizing the change in the threshold voltage Vth.

In addition, the display device can include at least one of a dummy hole DH21 arranged at the end of the gate line GLa, a dummy hole DH22 arranged on a signal line, that is, the gate line GLa, which is adjacent to the thin film transistor TFT in the display area, a dummy hole DH23 arranged on the data line DLa, or a dummy hole DH24 arranged in the bezel area adjacent to the end of the gate line GLa, and can further include a dummy electrode arranged to overlap the dummy holes DH21, DH22, DH23 and DH24.

Further, the dummy hole DH21 overlapped with the end of the gate line GLa and the dummy hole DH22 overlapped with the gate line GLa can have the same structure as that of the dummy hole DH1 shown in FIG. 8A described above, and can further include a dummy electrode DM1 shown in FIG. 8A. The dummy hole DH24 arranged in the bezel area adjacent to the end of the gate line GLa can have the same structure as the dummy holes DH4: DH41 to DH46 shown in FIGS. 9A to 9F described above, and can further include dummy electrodes DM4: DM41a to DM46d shown in FIG. 9A to 9F.

Referring to FIG. 17A, the dummy hole DH23 overlapped with the data line DLa can be arranged to pass through the buffer layer BF, the interlayer insulating layers ILD1 and ILD2, the first passivation layer PAS1, the planarization layer PNL and the second passivation layer PAS2, which are stacked on the data line DLa. The dummy electrode DM23 arranged on the second passivation layer PAS2, passing through the dummy hole DH23 can also be in contact with the data line DLa.

Referring to FIGS. 17B and 17C, in the display device according to an embodiment, the passivation hole PH31 arranged in the second passivation layer PAS2 on the thin film transistor TFTa can overlap the first source-drain electrode SD1a connected to the active layer ACTa, and can also overlap the data line DLa. The display device can further include a dummy electrode DM31 (FIG. 17B) arranged to overlap the passivation hole PH31, or can further include a plurality of dummy electrodes DM31a and DM31 (FIG. 17C) arranged to overlap the passivation hole PH31. Also, the dummy electrode DM31 can be formed of the same transparent conductive layer as the pixel electrode PXL. The dummy electrode 31a can be formed of the same transparent conductive layer as the common electrode VCOM.

In addition, the passivation hole PH32 arranged in the bezel area adjacent to the end of the gate line GLa can have the same structure as that of the passivation holes PH11 and PH12 shown in FIGS. 14A and 14B described above, and can further include dummy electrodes DM51, DM51a and DM51b shown in FIGS. 14A and 14B).

Figure 18:
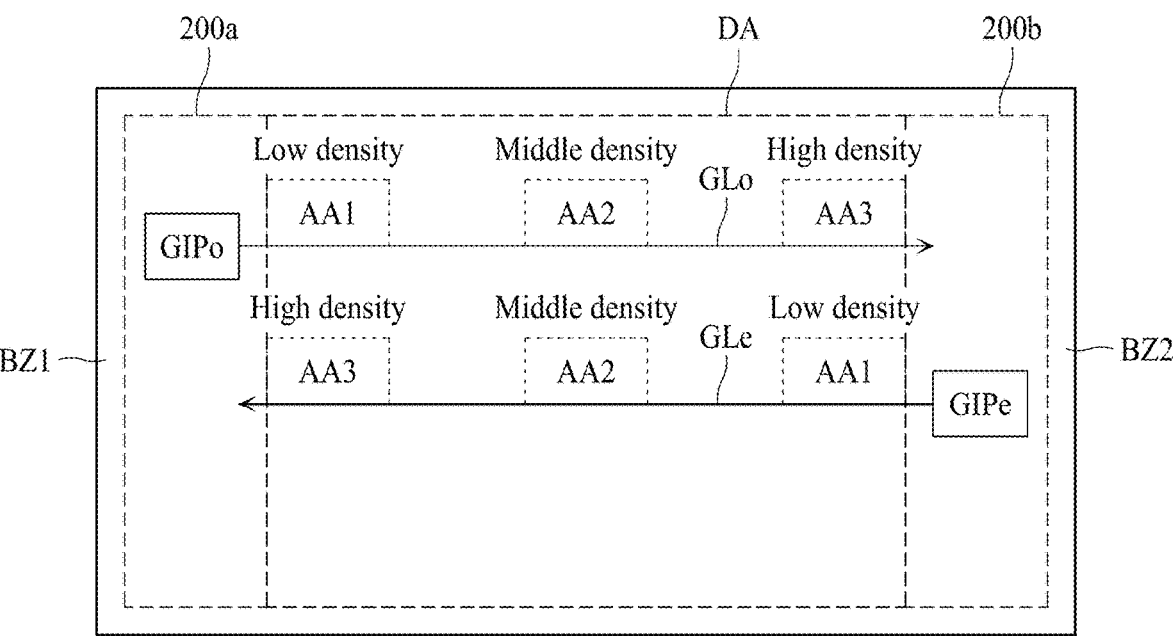
FIG. 18 is a view illustrating a differential application structure of a dummy hole density in a display device according to an embodiment of the present disclosure.

Next. FIG. 18 is a view illustrating a differential application structure of a dummy hole density in a display device of the present disclosure, and FIGS. 19A to 19C are plan views illustrating a partial area of each of first to third areas shown in FIG. 18.

Referring to FIG. 18, in the display panel driven in an interlacing manner according to an embodiment, the odd-numbered gate line GLo can include a left start end connected in contact with a stage circuit GIPo of the left gate driving circuit 200a in the left bezel area BZ1 and a right end arranged in the right bezel area BZ2. The even-numbered gate line GLe can include a right start end connected in contact with a stage circuit GIPe of the right gate driving circuit 200b in the right bezel area BZ2 and a left end arranged in the left bezel area BZ1.

In addition, the display panel can include at least one of a dummy hole or a passivation hole, which overlaps or is arranged adjacent to the thin film transistor or the signal line in the display area DA to serve as a hydrogen degasification path, thereby increasing hydrogen degasification. Further, the density of dummy holes arranged in the display area DA can be differentially applied depending on the distance from the end of the gate lines GLo and GLe.

Figure 19A:
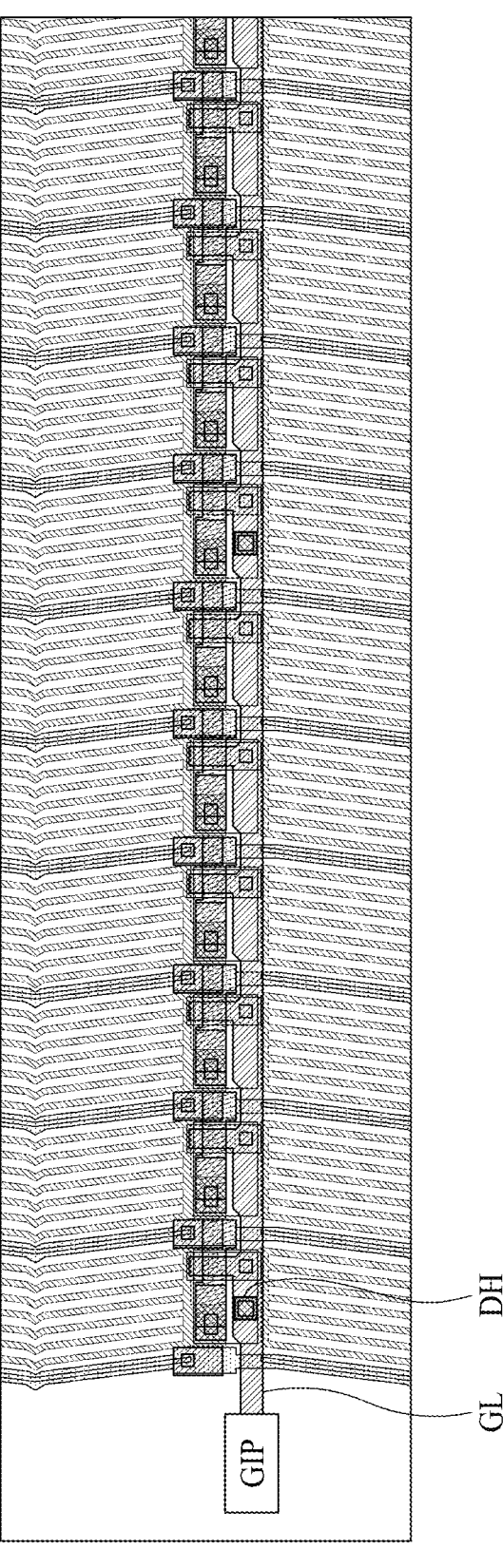
FIGS. 19A to 19C are plan views illustrating a partial area of each of first to third areas shown in FIG. 18.
Figure 19B:
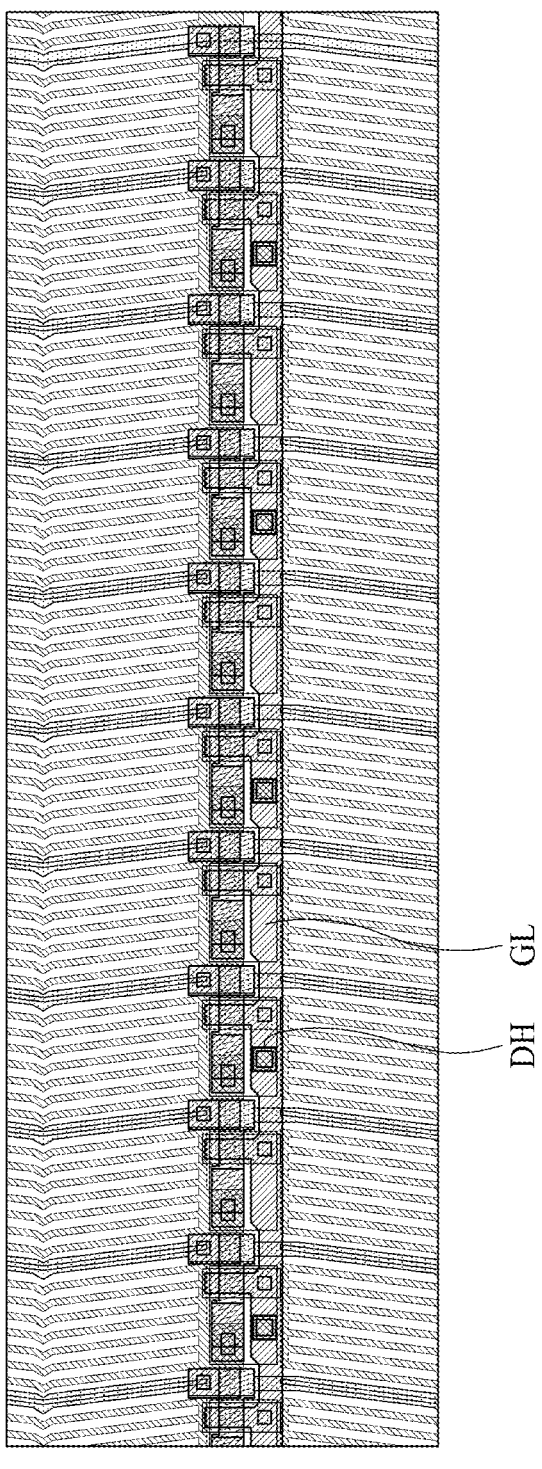
Figure 19C:
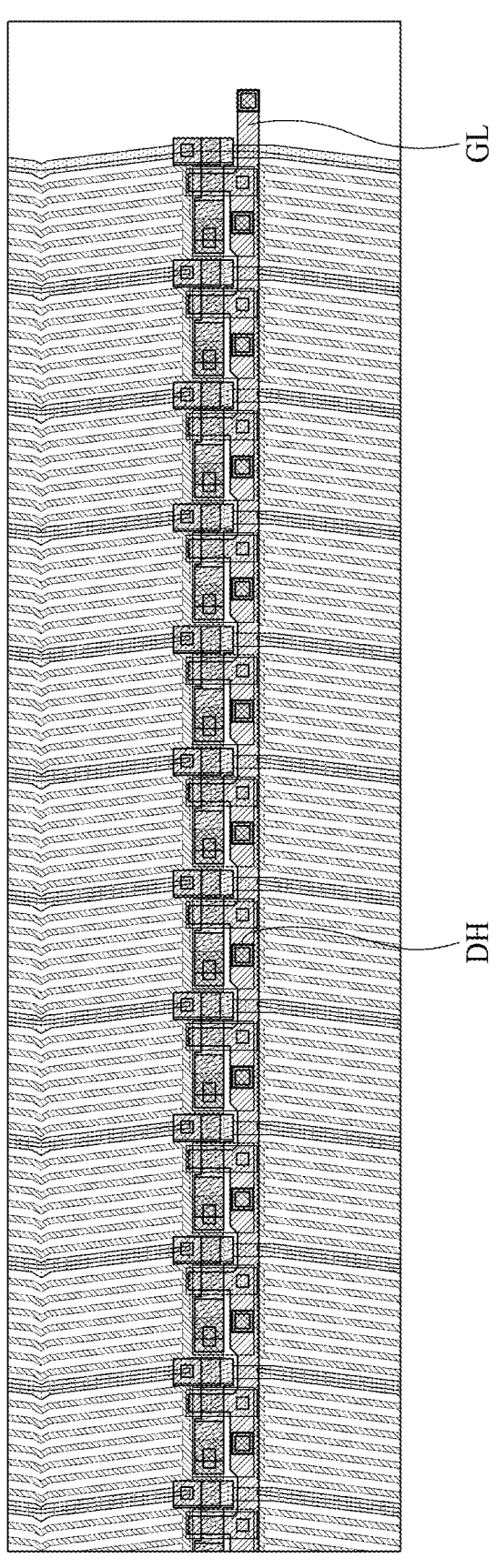

Referring to FIGS. 18 and 19A, the dummy holes DH can be arranged at a low density in a first area AA1 which is far from the ends of the gate lines GLO and GLe. Referring to FIGS. 18 and 19B, the dummy holes DH can be arranged at a middle density (medium density) in a second area AA2 located between the first area AA1 which is far from the ends of the gate lines GLo and GLe and a third area AA3 which is close to the ends of the gate lines GLo and GLe.

Referring to FIGS. 18 and 19C, the dummy holes DH can be arranged at a high density in the third area AA3 close to the ends of the gate lines GLo and GLe. Accordingly, the display panel can prevent the threshold voltage of the thin film transistor from being shifted to the negative voltage and minimize the threshold voltage deviation of the thin film transistor by minimizing the difference in hydrogen inflow due to the structural difference between the start end and the end of each of the gate lines GLo and GLe.

Figure 20A:
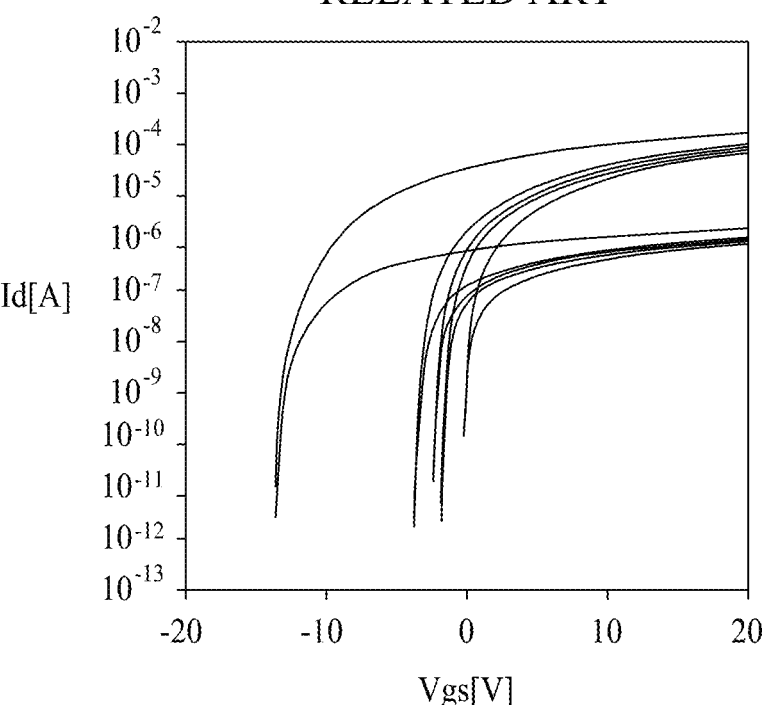
FIG. 20A is a graph illustrating voltage-current characteristics of a thin film transistor in a display device a comparative example of the related art and FIGS. 20B and 20C are graphs illustrating voltage-current characteristics of a thin film transistor in a display device according to an embodiment of the present disclosure.
Figure 20B:
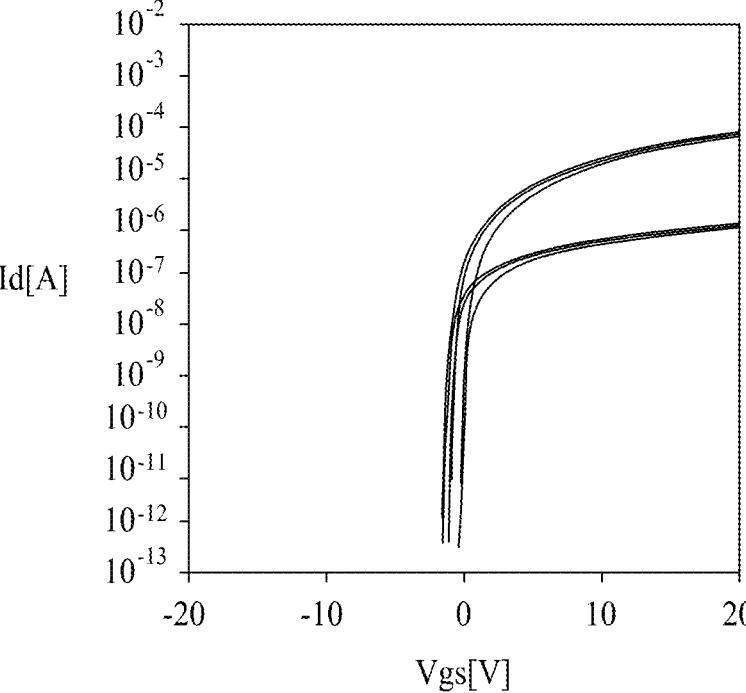
Figure 20C:
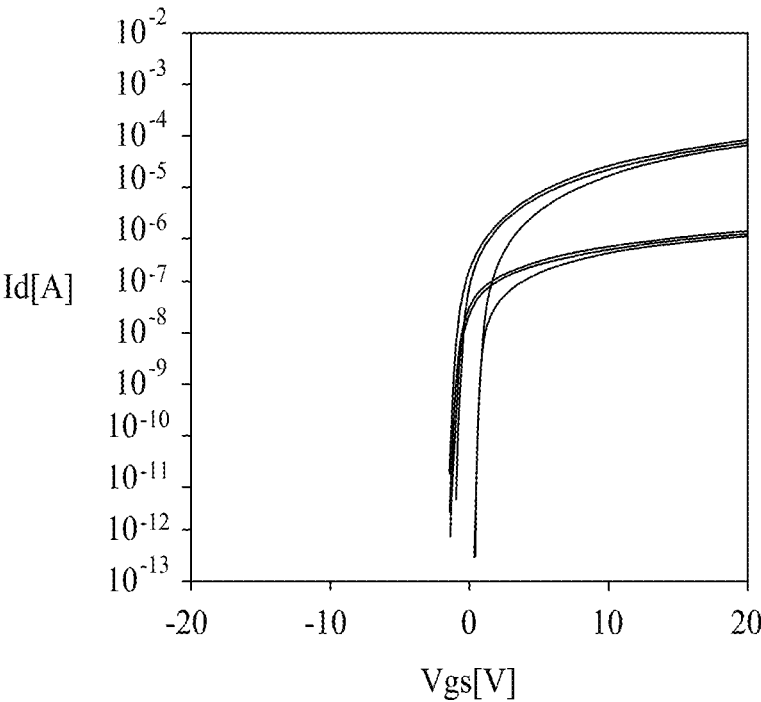

Next, FIG. 20A is a graph illustrating voltage-current characteristics of a thin film transistor in a display device a comparative example of the related art, and FIGS. 20B and 20C are graphs illustrating voltage-current characteristics of a thin film transistor in a display device of the present disclosure.

Referring to FIG. 20A, when the display device according to the comparative example of the related art does not include a dummy hole that overlaps the thin film transistor, the hydrogen inflow of the active layer of the thin film transistor can be increased so that the threshold voltage of the thin film transistor is shifted in the negative direction.

Referring to FIG. 20B, the display device includes a dummy hole arranged on the thin film transistor, passing through the first passivation layer, the planarization layer and the second passivation layer, and a dummy electrode arranged to overlap the dummy hole, thereby increasing hydrogen degasification through the dummy hole and the dummy electrode. Accordingly, the threshold voltage of the thin film transistor is shifted in the positive direction without being shifted in the negative direction.

Referring to FIG. 20C, even though the display device includes a dummy hole (a passivation hole) passing through the second passivation layer on the thin film transistor and a dummy electrode overlapped with the dummy hole, hydrogen degasification is increased through the dummy hole and the dummy electrode, so that the threshold voltage of the thin film transistor is shifted in the positive direction rather than in the negative direction.

Figure 21A:
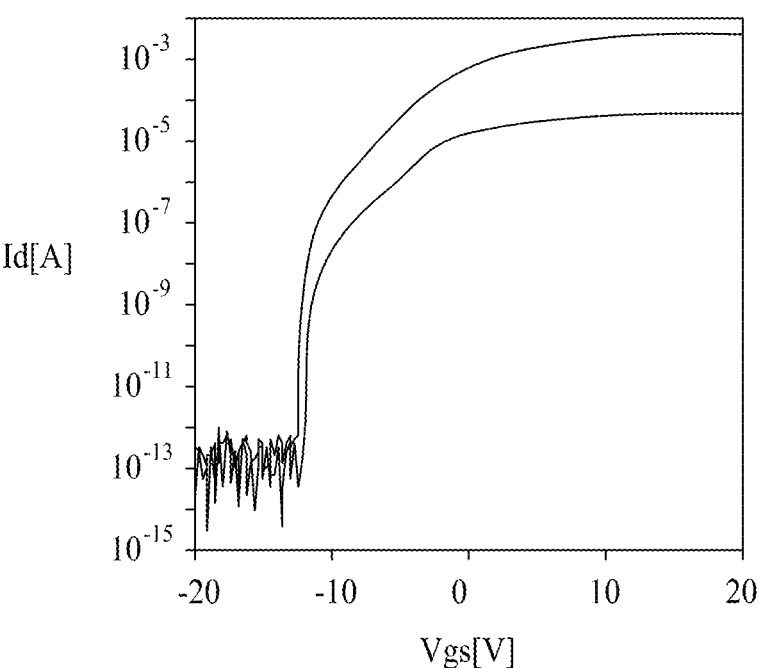
FIGS. 21A and 21B are graphs illustrating voltage-current characteristics of a thin film transistor according to a density of a dummy hole in a display device according to an embodiment of the present disclosure.
Figure 21B:
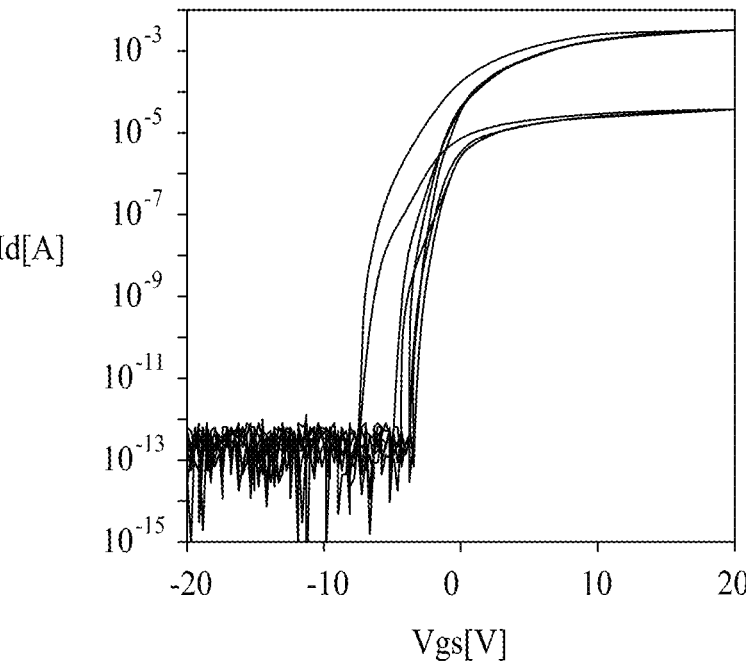

Next, FIGS. 21A and 21B are graphs illustrating voltage-current characteristics of a thin film transistor according to a density of a dummy hole in a display device of the present disclosure.

Referring to FIGS. 21A and 21B, the density of the dummy hole arranged around the thin film transistor is increased from a low density (FIG. 21A) to a high density (FIG. 21B), and hydrogen degasification is increased so that the threshold voltage of the thin film transistor is shifted in the positive direction.

According to the present disclosure, the following advantageous effects can be obtained. As described above, the display device according to an embodiment of the present disclosure can differentially apply the density of the hydrogen degasification path (the dummy hole and the passivation hole) depending on the distance from the end of the gate line driven in the single feeding manner or the interlacing manner, thereby increasing the hydrogen degasification effect and minimizing the difference in the amount of hydrogen inflow.

Accordingly, the display device according to an embodiment of the present disclosure can improve reliability and uniformity by minimizing the threshold voltage deviation of the thin film transistor according to the position in the display area.

Further, the display device according to an embodiment of the present disclosure can reduce or minimize a leakage current by preventing the threshold voltage of the thin film transistor from being shifted in the negative direction, thereby improving reliability and providing improved image quality with low power consumption. The display device can also improve reliability by minimizing the threshold voltage deviation between the first thin film transistor in the display area and the second thin film transistor in the gate driving circuit, which are different from each other in the stacked structure.

A display device according to some embodiments of the present disclosure can include a display panel including a display area in which gate lines, data lines and thin film transistors are arranged, and first and second bezel areas located around the display area, a gate driving circuit arranged in at least one of the first and second bezel areas and configured to drive the gate lines, and dummy holes arranged in at least one of the display area and the first and second bezel areas, wherein each of the gate lines includes a start end connected to the gate driving circuit in any one of the first and second bezel areas and an end located in the other one of the first and second bezel areas, and the dummy holes have a difference in density in accordance with a distance from the end of each gate line.

The display device can further include dummy electrodes respectively arranged in the dummy holes. In the display device according to some embodiments, the density of the dummy holes can be higher as the dummy holes are closer to the end of each gate line, and can be lower as the dummy holes are closer to the start end of each gate line. Also, the gate driving circuit can be arranged in the first bezel area, and can be connected to the start end of each of the gate lines in the first bezel area, and the end of each of the gate lines can be arranged in the second bezel area.

In addition, the gate driving circuit can include a first gate driving circuit arranged in the first bezel area and connected to the start end of each of the odd-numbered gate lines among the gate lines in the first bezel area, and a second gate driving circuit arranged in the second bezel area and connected to the start end of each of the even-numbered gate lines among the gate lines in the second bezel area, where the end of each of the odd-numbered gate lines can be arranged in the second bezel area, and the end of each of the even-numbered gate lines can be arranged in the first bezel area.

Further, the dummy holes can include at least one of a first type dummy hole arranged on the end of each gate line to overlap the end of each gate line, a second type dummy hole arranged on each gate line to overlap each gate line, and a third type dummy hole arranged on each data line to overlap each data line. In the display device according to some embodiments, the dummy electrodes can include at least one of a first dummy electrode arranged in the first type dummy hole, a second dummy electrode arranged in the second type dummy hole, and a third dummy electrode arranged in the third type dummy hole.

Also, each of the first type dummy hole and the second type dummy hole can be arranged to pass through a plurality of insulating layers stacked on each gate line. In the display device according to some embodiments, each of the first dummy electrode and the second dummy electrode can be arranged on an uppermost insulating layer among a plurality of insulating layers stacked on each gate line and can be in contact with the gate line through each of the first type dummy hole and the second type dummy hole.

In addition, the third type dummy hole can be arranged to pass through a plurality of insulating layers stacked on each data line. The third dummy electrode can also be arranged on an uppermost insulating layer among a plurality of insulating layers stacked on each data line and can be in contact with the data line through the third type dummy hole.

Further, the dummy electrodes can be arranged as the same transparent conductive layer on the same layer as a pixel electrode connected to the thin film transistor. In addition, the dummy holes can further include fourth type dummy holes arranged between the end of each gate line and the gate driving circuit in at least one of the first bezel area and the second bezel area.

Also, the dummy electrodes can further include a fourth dummy electrode arranged in the fourth type dummy hole, and at least one fifth dummy electrode arranged below the fourth type dummy hole. Further, the fourth type dummy hole can be arranged to pass through a plurality of insulating layers stacked on the at least one fifth dummy electrode, and the fourth dummy electrode can be arranged on an uppermost insulating layer among the plurality of insulating layers and is in contact with the at least one fifth dummy electrode through the fourth type dummy hole.

In addition, the fourth dummy electrode can be arranged as the same transparent conductive layer on the same layer as the pixel electrode connected to the thin film transistor, and the at least one fifth dummy electrode can be arranged as the same metal layer on the same layer as at least one electrode of the thin film transistor. Also, the thin film transistor can include a light shield electrode arranged on a substrate, an active layer arranged to overlap the light shield electrode and a buffer layer between the light shield electrode and the active layer, a gate electrode arranged between the active layer and a gate insulating layer, and first and second source-drain electrodes respectively connected to first and second connection areas of the active layer through first and second contact holes in an interlayer insulating layer covering the gate insulating layer and the gate electrode, wherein the at least one fifth dummy electrode can include at least one of a light shield metal layer which is the same as the light shield electrode, a gate metal layer which is the same as the gate electrode, and a source-drain metal layer which is the same as the first and second source-drain electrodes.

In addition, the thin film transistor can include a light shield electrode arranged on a substrate, an active layer arranged to overlap the light shield electrode and a buffer layer between the light shield electrode and the active layer, a gate electrode arranged between the active layer and a gate insulating layer, and first and second source-drain electrodes respectively connected to first and second connection areas of the active layer through first and second contact holes in the gate insulating layer, wherein the at least one fifth dummy electrode can include at least one of a light shield metal layer which is the same as the light shield electrode, a gate metal layer which is the same as the gate electrode, and a source-drain metal layer which is the same as the first and second source-drain electrodes.

Further, the at least one fifth dummy electrode can include a hydrogen capture metal material included in at least one of the light shield metal layer, the gate metal layer, and the source-drain metal layer. The display device can further include at least one of first passivation holes provided in an upper passivation layer in the display area, and second passivation holes provided in the upper passivation layer located between the end of each gate line and the gate driving circuit in at least one of the first bezel area or the second bezel area.

The display device according to some embodiments of the present disclosure can further include at least one of sixth dummy electrodes respectively arranged in the first passivation holes, and seventh dummy electrodes respectively arranged in the second passivation holes. Also, the first passivation holes can be arranged to overlap or be adjacent to at least one of the gate line, the data line, and the thin film transistor.

The display device according to some embodiments of the present disclosure can further include at least one of an eighth dummy electrode arranged below the first passivation hole, being in contact with the sixth dummy electrode through the first passivation hole, and a ninth dummy electrode arranged below the second passivation hole, being in contact with the seventh dummy electrode through the second passivation hole.

In addition, at least one of the sixth dummy electrode or the seventh dummy electrode can be arranged as the same transparent conductive layer on the same layer as the pixel electrode connected to the thin film transistor, and at least one of the eighth dummy electrode or the ninth dummy electrode can be arranged as the same transparent conductive layer on the same layer as a common electrode overlapped between the pixel electrode and the upper passivation layer.

The display device according to one or more embodiments of the present disclosure can be applied to various electronic devices. For example, the display device according to one or more embodiments of the present disclosure can be applied to a mobile device, a video phone, a smart watch, a watch phone, a wearable device, a foldable device, a rollable device, a bendable device, a flexible device, a curved device, an electronic diary, electronic book, a portable multimedia player (PMP), a personal digital assistant (PDA), MP3 player, a mobile medical device, a desktop PC, a laptop PC, a netbook computer, a workstation, a navigator, a vehicle navigator, a vehicle display device, a television, a wall paper display device, a signage device, a game device, a notebook computer, a monitor, a camera, a camcorder, and home appliances.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The above-described feature, structure, and effect of the present disclosure are included in at least one embodiment of the present disclosure, but are not limited to only one embodiment. Furthermore, the feature, structure, and effect described in at least one embodiment of the present disclosure can be implemented through combination or modification of other embodiments by those skilled in the art. Therefore, content associated with the combination and modification should be construed as being within the scope of the present disclosure.

It will be apparent to those skilled in the art that the present disclosure described above is not limited by the above-described embodiments and the accompanying drawings and that various substitutions, modifications and variations can be made in the present disclosure without departing from the scope of the disclosures. Consequently, the scope of the present disclosure is defined by the accompanying claims and it is intended that all variations or modifications derived from the meaning, scope and equivalent concept of the claims fall within the scope of the present disclosure.

What is claimed is:

1. A display device comprising:
a display panel including a display area in which gate lines, data lines and thin film transistors are arranged, and first and second bezel areas located around the display area;
a gate driving circuit arranged in at least one of the first and second bezel areas and configured to drive the gate lines; and
dummy holes arranged in at least one of the display area and the first and second bezel areas,
wherein each of the gate lines includes a start end connected to the gate driving circuit located in any one of the first and second bezel areas and an end located in the other one of the first and second bezel areas,
wherein a density of the dummy holes differs according to a distance from the end of each gate line, and
wherein the density of the dummy holes is higher as the dummy holes are closer to the end of each gate line, and is lower as the dummy holes are closer to the start end of each gate line.

2. The display device of claim 1, further comprising:
dummy electrodes respectively arranged in the dummy holes.

3. The display device of claim 1, wherein the gate driving circuit is arranged in the first bezel area, and is connected to the start end of each of the gate lines located in the first bezel area, and
wherein the end of each of the gate lines is arranged in the second bezel area.

4. The display device of claim 1, wherein the gate driving circuit includes:

a first gate driving circuit arranged in the first bezel area and connected to the start end of each of the odd-numbered gate lines among the gate lines in the first bezel area; and a second gate driving circuit arranged in the second bezel area and connected to the start end of each of the even-numbered gate lines among the gate lines in the second bezel area, wherein the end of each of the odd-numbered gate lines is arranged in the second bezel area, and wherein the end of each of the even-numbered gate lines is arranged in the first bezel area.

5. The display device of claim 2, wherein the dummy holes include at least one of:

a first type dummy hole overlapping the end of each gate line, a second type dummy hole overlapping each gate line, and a third type dummy hole overlapping each data line.

6. The display device of claim 5, wherein the dummy electrodes include at least one of:

a first dummy electrode arranged in the first type dummy hole;

a second dummy electrode arranged in the second type dummy hole; and a third dummy electrode arranged in the third type dummy hole.

7. The display device of claim 6, wherein each of the first type dummy hole and the second type dummy hole passes through a plurality of insulating layers stacked on each gate line.

8. The display device of claim 7, wherein each of the first dummy electrode and the second dummy electrode is arranged on an uppermost insulating layer among the plurality of insulating layers stacked on each gate line and contacts the gate line through each of the first type dummy hole and the second type dummy hole.

9. The display device of claim 5, wherein the third type dummy hole passes through a plurality of insulating layers stacked on each data line.

10. The display device of claim 7, wherein the third dummy electrode is arranged on an uppermost insulating layer among the plurality of insulating layers stacked on each data line and contacts the data line through the third type dummy hole.

11. The display device of claim 6, wherein the dummy electrodes are arranged as a same transparent conductive layer on a same layer as a pixel electrode connected to the thin film transistor.

12. The display device of claim 11, wherein the dummy holes further include fourth type dummy holes arranged between the end of each gate line and the gate driving circuit in at least one of the first bezel area and the second bezel area.

13. The display device of claim 12, wherein the dummy electrodes further include:

a fourth dummy electrode arranged in the fourth type dummy hole; and at least one fifth dummy electrode arranged below the fourth type dummy hole.

14. The display device of claim 13, wherein the fourth type dummy hole passes through a plurality of insulating layers stacked on the at least one fifth dummy electrode, and wherein the fourth dummy electrode is arranged on an uppermost insulating layer among the plurality of insulating layers and contacts the at least one fifth dummy electrode through the fourth type dummy hole.

15. The display device of claim 13, wherein the fourth dummy electrode is arranged as a same transparent conductive layer on a same layer as the pixel electrode connected to the thin film transistor, and wherein the at least one fifth dummy electrode is arranged as a same metal layer on a same layer as at least one electrode of the thin film transistor.

16. The display device of claim 15, wherein the thin film transistor includes:

a light shield electrode arranged on a substrate;

an active layer overlapping the light shield electrode and a buffer layer between the light shield electrode and the active layer;

a gate electrode arranged between the active layer and a gate insulating layer; and first and second source-drain electrodes respectively connected to first and second connection areas of the active layer through first and second contact holes in an interlayer insulating layer covering the gate insulating layer and the gate electrode, and wherein the at least one fifth dummy electrode includes at least one of a light shield metal layer which is a same as the light shield electrode, a gate metal layer which is a same as the gate electrode, and a source-drain metal layer which is a same as the first and second source-drain electrodes.

17. The display device of claim 16, wherein the at least one fifth dummy electrode includes a hydrogen capture metal material included in at least one of the light shield metal layer, the gate metal layer, and the source-drain metal layer.

18. The display device of claim 16, wherein the thin film transistor includes:

a light shield electrode arranged on the substrate;

an active layer overlapping the light shield electrode and a buffer layer between the light shield electrode and the active layer;

a gate electrode arranged between the active layer and a gate insulating layer; and first and second source-drain electrodes respectively connected to first and second connection areas of the active layer through first and second contact holes in the gate insulating layer, and wherein the at least one fifth dummy electrode includes at least one of a light shield metal layer which is a same as the light shield electrode, a gate metal layer which is a same as the gate electrode, and a source-drain metal layer which is a same as the first and second source-drain electrodes.

19. The display device of claim 17, wherein the at least one fifth dummy electrode includes a hydrogen capture metal material included in at least one of the light shield metal layer, the gate metal layer, and the source-drain metal layer.

20. The display device of claim 11, further comprising at least one of:

first passivation holes provided in an upper passivation layer in the display area; and second passivation holes provided in the upper passivation layer located between the end of each gate line and the gate driving circuit in at least one of the first bezel area or the second bezel area.

21. The display device of claim 20, further comprising at least one of:

sixth dummy electrodes respectively arranged in the first passivation holes; and seventh dummy electrodes respectively arranged in the second passivation holes.

22. The display device of claim 20, wherein the first passivation holes overlap or are adjacent to at least one of the gate line, the data line, and the thin film transistor.

23. The display device of claim 21, further comprising at least one of:

an eighth dummy electrode arranged below the first passivation hole, and contacting the sixth dummy electrode through the first passivation hole; and a ninth dummy electrode arranged below the second passivation hole, and contacting the seventh dummy electrode through the second passivation hole.

24. The display device of claim 23, wherein at least one of the sixth dummy electrode or the seventh dummy electrode is arranged as a same transparent conductive layer on a same layer as the pixel electrode connected to the thin film transistor, and wherein at least one of the eighth dummy electrode or the ninth dummy electrode is arranged as a same transparent conductive layer on a same layer as a common electrode overlapped between the pixel electrode and the upper passivation layer.

25. A display device comprising:

a display panel including a display area having gate lines, data lines and thin film transistors, and a bezel area surrounding the display area;

a gate driving circuit arranged in the bezel area and configured to drive the gate lines connected to the gate driving circuit and extending across the display area and ending in the bezel area; and first dummy holes arranged in the display area and configured to provide a hydrogen degasification path; and second dummy holes arranged in the bezel area and configured to provide another hydrogen degasification path, wherein a density of the second dummy holes in the bezel area is greater than a density of the first dummy holes in in the display area, and wherein the density of the first dummy holes is lower closer to the gate driving circuit in the bezel area and higher closer to the ending of the gate line in the bezel area.

26. The display device of claim 25, wherein the density of the first and second dummy holes are controlled to minimize a variation of voltage thresholds of transistors included in the display area and the bezel area.

27. The display device of claim 25, wherein the bezel area includes a first bezel area on a first side of the display panel and a second bezel area on a second side of the display panel.

28. The display device of claim 27, wherein the gate driving circuit is arranged on the first bezel area and the gate lines extend across the display area and ending in the second bezel area.

29. The display device of claim 27, wherein the gate driving circuit includes:

a first gate driving circuit arranged in the first bezel area and connected to a start end of each of odd-numbered gate lines among the gate lines in the first bezel area; and a second gate driving circuit arranged in the second bezel area and connected to a start end of each of even-numbered gate lines among the gate lines in the second bezel area, wherein the end of each of the odd-numbered gate lines is arranged in the second bezel area, and wherein the end of each of the even-numbered gate lines is arranged in the first bezel area.

* * * * *